(12) United States Patent
Takahashi

(10) Patent No.: US 10,011,260 B2
(45) Date of Patent: Jul. 3, 2018

(54) HYBRID VEHICLE HAVING ACCELERATION CONTROL

(71) Applicant: TOYOTA JIDOSHA KABUSHIKI KAISHA, Toyota-shi, Aichi-ken (JP)

(72) Inventor: Yoshimitsu Takahashi, Miyoshi (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 89 days.

(21) Appl. No.: 15/016,323

(22) Filed: Feb. 5, 2016

(65) Prior Publication Data

US 2016/0229390 A1 Aug. 11, 2016

(30) Foreign Application Priority Data

Feb. 6, 2015 (JP) .................. 2015-022360

(51) Int. Cl.
| | |
|---|---|
| *G06F 19/00* | (2018.01) |
| *B60K 6/00* | (2006.01) |
| *B60W 10/08* | (2006.01) |
| *B60W 10/06* | (2006.01) |
| *B60K 6/445* | (2007.10) |
| *B60W 50/06* | (2006.01) |
| *B60W 20/10* | (2016.01) |

(52) U.S. Cl.
CPC ............ *B60W 10/08* (2013.01); *B60K 6/445* (2013.01); *B60W 10/06* (2013.01); *B60W 20/10* (2013.01); *B60W 50/06* (2013.01); *B60W 2540/10* (2013.01); *B60W 2710/0666* (2013.01); *B60W 2710/083* (2013.01); *Y02T 10/6239* (2013.01); *Y02T 10/6286* (2013.01); *Y10S 903/93* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2007/0254772 | A1* | 11/2007 | Satou ................ | F02D 41/123 477/107 |
| 2010/0063704 | A1* | 3/2010 | Okubo ................ | B60K 6/365 701/99 |

FOREIGN PATENT DOCUMENTS

| | | |
|---|---|---|
| CN | 101665110 A | 3/2010 |
| JP | 2014-92146 | 5/2014 |

* cited by examiner

*Primary Examiner* — Adam D Tissot
(74) *Attorney, Agent, or Firm* — Finnegan, Henderson, Farabow, Garrett & Dunner LLP

(57) ABSTRACT

A hybrid vehicle includes an engine, a motor, a battery and an electronic control unit. The electronic control unit is configured to set a running torque based on a required torque of a drive shaft according to an accelerator opening degree. The electronic control unit is configured to control the engine and the motor such that the running torque is output to the drive shaft. The electronic control unit is configured to limit the power of the engine by use of the running torque or a drive-shaft torque output to the drive shaft as a torque for determination until the torque for determination reaches a torque threshold smaller than the required torque, as compared with the power of the engine after the torque for determination has reached the torque threshold, when a predetermined acceleration request is made by a user.

7 Claims, 15 Drawing Sheets

HYBRID VEHICLE HAVING ACCELERATION CONTROL

INCORPORATION BY REFERENCE

The disclosure of Japanese Patent Application No. 2015-022360 filed on Feb. 6, 2015 including the specification, drawings and abstract is incorporated herein by reference in its entirety.

BACKGROUND

1. Technical Field

The disclosure relates to a hybrid vehicle.

2. Description of Related Art

Japanese Patent Application Publication No. 2014-92146 (JP 2014-92146 A) describes a control device for an internal combustion engine including a variable valve timing mechanism and a throttle valve. The variable valve timing mechanism changes a valve timing of an engine valve. The throttle valve adjusts an intake-air amount. The control device controls a valve timing of the engine valve and an opening degree of the throttle valve according to a target torque required to the internal combustion engine. In the control device, when the target torque changes, the variable valve timing mechanism and the throttle valve are controlled so that a timing at which that an intake negative pressure starts to change by the change of the opening degree of the throttle valve is synchronized with a timing at which the valve timing of the engine valve starts to change. When the target torque increases, the opening degree of the throttle valve is corrected so that the opening degree of the throttle valve is larger than its steady state relative to the target torque. Hereby, a response delay of the intake negative pressure due to a volume of an intake system from the throttle valve to a cylinder can be corrected (improved).

SUMMARY

In a hybrid vehicle including an engine and a motor that can output a power to a drive shaft connected to an axle, and a battery that exchanges an electric power with the motor, when an accelerator pedal is largely stepped by a driver, a running torque is set based on a required torque according to an accelerator opening degree in consideration of controllability of the engine and the motor. The engine and the motor are controlled so that the running torque is output to the drive shaft. At this time, if a rotation number of the engine increases quickly after the accelerator pedal is stepped, an increase of a torque of the drive shaft may be delayed with respect to the increase of the rotation number of the engine, so that the driver may not have a good acceleration feeling.

The disclosure provides a hybrid vehicle that can give a good acceleration feeling to a driver.

A first aspect of the disclosure provides a hybrid vehicle includes an engine, a motor, a battery and an electronic control unit. The engine is configured to output a power to a drive shaft, the drive shaft being connected to an axle of the hybrid vehicle. The motor is configured to output a power to the drive shaft. The battery is configured to exchange an electric power with the motor. The electronic control unit is configured to set a running torque based on a required torque of the drive shaft according to an accelerator opening degree. The electronic control unit is configured to control the engine and the motor such that the running torque is output to the drive shaft. The electronic control unit is configured to limit the power of the engine by use of the running torque or a drive-shaft torque output to the drive shaft as a torque for determination until the torque for determination reaches a torque threshold smaller than the required torque, as compared with the power of the engine after the torque for determination has reached the torque threshold, when a predetermined acceleration request is made by a user.

According to the above configuration, the hybrid vehicle sets a running torque based on a required torque of the drive shaft according to the accelerator opening degree, and controls the engine and the motor so that the running torque is output to the drive shaft. When the predetermined acceleration request is made, the power of the engine is limited by use of the running torque or the drive-shaft torque output to the drive shaft as the torque for determination until the torque for determination reaches the torque threshold smaller than the required torque, as compared with the power of the engine after the torque for determination has reached the torque threshold. Accordingly, the power of the engine is limited until the torque for determination reaches the torque threshold, so as to restrain increases of the rotation number of the engine and the torque. After the torque for determination has reached the torque threshold, the limitation on the power of the engine is relaxed or released, so as to increase the rotation number of the engine and the torque. Hereby, it is possible to restrain delay of the increase of the drive-shaft torque with respect to the increase of the rotation number of the engine. As a result, it is possible to give a good acceleration feeling to the driver.

In the hybrid vehicle, the electronic control unit may be configured to limit the power of the engine by an upper limit power when the predetermined acceleration request is made. The electronic control unit may be configured to set the upper limit power based on a first power until the torque for determination reaches the torque threshold when the predetermined acceleration request is made. The electronic control unit may be configured to set the upper limit power based on a second power after the torque for determination has reached the torque threshold when the predetermined acceleration request is mad. The first power may be larger one of a value of zero and a power corresponding to a difference between a running power corresponding to the running torque and an allowable output power of the battery. The second power may be a power gradually approaching a third power according to the running power and a required power for charging and discharging the battery. According to the above configuration, when the predetermined acceleration request is made, it is possible to prevent the power of the engine from decreasing as compared with the power before the predetermined acceleration request is made.

In the hybrid vehicle, the electronic control unit may be configured to perform lower limit guard on the first power or the second power by the running power before the predetermined acceleration request is made, so as to set the upper limit power, when the predetermined acceleration request is made. According to the above configuration, at the time when the power (torque) of the engine is increased, the power (torque) can be increased more appropriately by advancing the opening/closing timing. In the hybrid vehicle, the engine may include a variable valve timing mechanism. The variable valve timing mechanism may be configured to change an opening timing and a closing timing of an intake valve. The electronic control unit may be configured to control the variable valve timing mechanism such that the opening timing and the closing timing comes closer to an advance side after the torque for determination has reached the torque threshold, as compared with the opening timing and the closing timing before the torque for determination reaches the torque threshold, when the predetermined acceleration request is made. In the hybrid vehicle, the electronic control unit may be configured to set a first temporary torque of the engine by use of an operation line of the engine and a temporary required power according to a running power corresponding to the running torque and the required power for charging and discharging the battery, after the torque for determination has reached the torque threshold, when the predetermined acceleration request is made.

In the hybrid vehicle, when the predetermined acceleration request is made, the electronic control unit may be configured to increase the running torque to the torque threshold by a first increase rate, and then increase the running torque to the required torque by a second increase rate, the second increase rate is smaller than the first increase rate.

In the hybrid vehicle, the electronic control unit may be configured to determine that the predetermined acceleration request is made when any of a plurality of conditions is established. The plurality of conditions may include: a first condition that the required torque becomes larger than a second torque threshold; a second condition that the accelerator opening degree becomes larger than an opening degree threshold; a third condition that a required acceleration according to the accelerator opening degree becomes larger than an acceleration threshold; and a fourth condition that a power according to the required torque and a rotation number of the drive shaft becomes larger than a power threshold.

The hybrid vehicle further includes a generator and a planetary gear. The generator is configured to exchange an electric power with the battery. The planetary gear includes three rotating elements connected to the drive shaft, an output shaft of the engine, and a rotating shaft of the generator.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Next will be described an embodiment with reference to the drawings.

Figure 1:
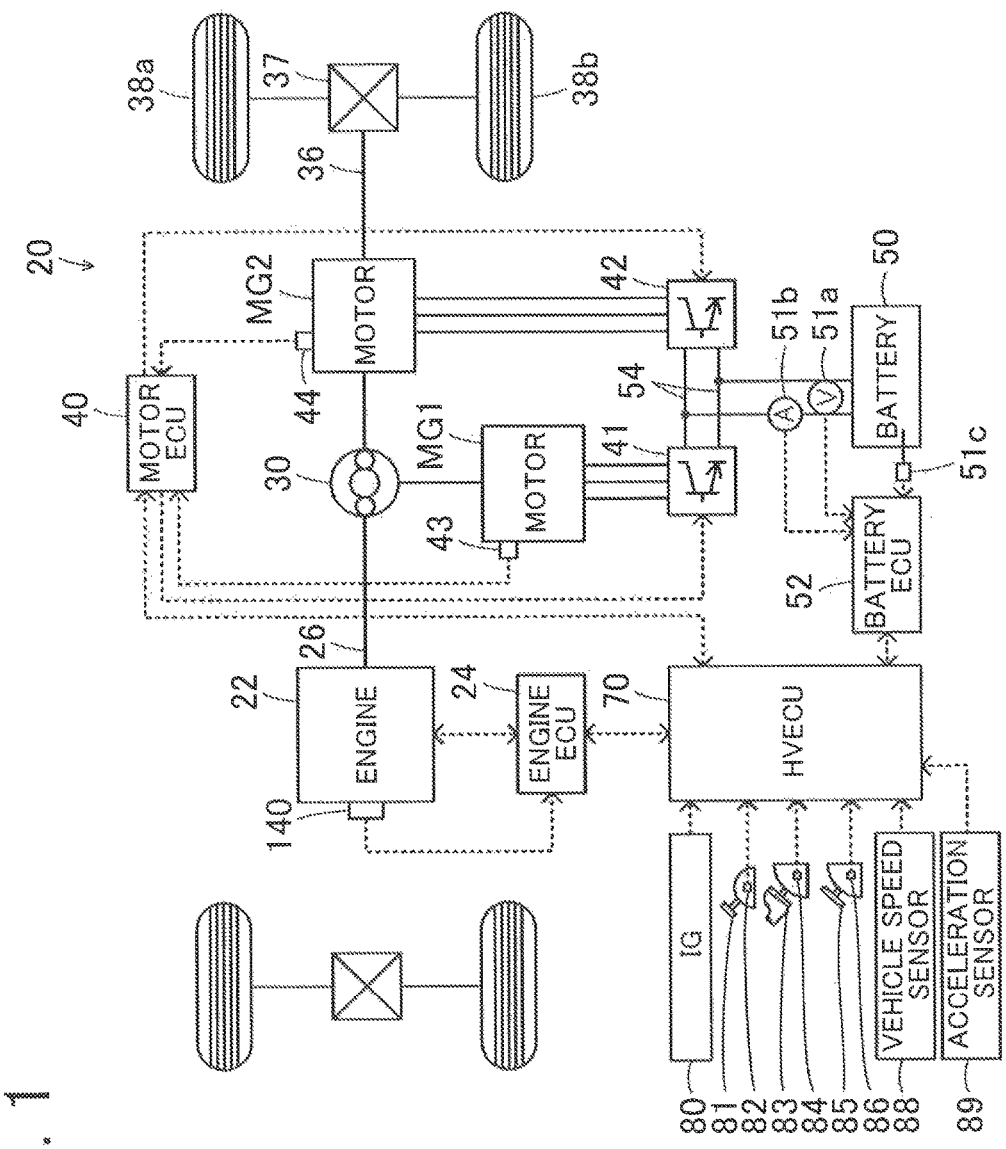
FIG. 1 is a configuration diagram illustrating an outline of a configuration of a hybrid vehicle 20 according to one embodiment.

FIG. 1 is a configuration diagram illustrating an outline of a configuration of a hybrid vehicle 20 according to one embodiment. As illustrated herein, the hybrid vehicle 20 of the embodiment includes an engine 22, a planetary gear 30, motors MG1, MG2, inverters 41, 42, a battery 50, and a hybrid electronic control unit (hereinafter referred to as the "HVECU") 70.

Figure 2:
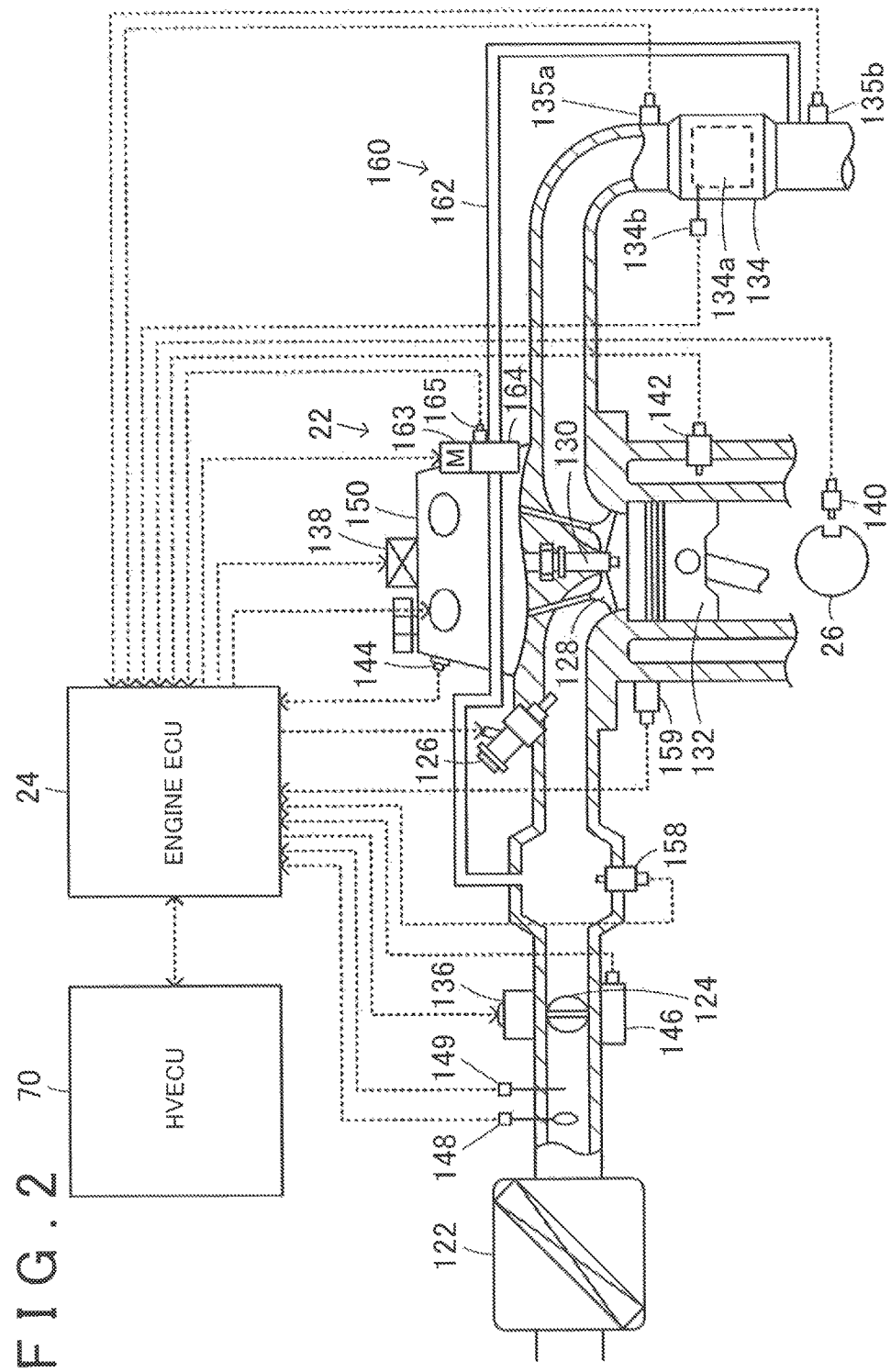
FIG. 2 is a configuration diagram illustrating an outline of a configuration of an engine 22 according to the above embodiment.

In the embodiment, the engine 22 is an internal combustion engine that outputs a power by using gasoline or gas oil as fuel. FIG. 2 is a configuration diagram illustrating an outline of a configuration of the engine 22. In the engine 22, air purified by an air cleaner 122 is intaken via a throttle valve 124 and fuel is injected from a fuel injection valve 126, so that the air is mixed with the fuel. The fuel/air mixture is intaken into a combustion chamber via an intake valve 128. In the engine 22, the fuel/air mixture intaken into the combustion chamber is exploded and burned by a spark of an ignition plug 130. A piston 132 is pushed down by energy of the explosion, so that a reciprocating motion of the piston 132 is converted into a rotational motion of a crankshaft (an example of an output shaft) 26. Exhaust gas from the combustion chamber is exhausted outside via an exhaust gas control apparatus 134 having a catalyst (a three-way catalyst) 134a that purifies harmful components such as carbon monoxide (CO), hydrocarbon (HC), and nitrogen oxide (NOx). The exhaust gas from the combustion chamber is not only exhausted outside, but is also supplied to an intake side via an exhaust gas recirculation system (hereinafter referred to as an EGR system) 160 that flows the exhaust gas back to the intake air. The EGR system 160 includes an EGR pipe 162 and an EGR valve 164. The EGR pipe 162 is connected to a subsequent stage of the exhaust gas control apparatus 134, and is used to supply the exhaust gas to an intake-side surge tank. The EGR valve 164 is placed in the EGR pipe 162 and is driven by a stepping motor 163. The EGR system 160 adjusts an opening degree of the EGR valve 164 so as to adjust a reflux volume of the exhaust gas as uncombusted gas, thereby flowing the exhaust gas back to the intake side. The engine 22 is configured to intake the fuel/air mixture of the air, the exhaust gas, and the gasoline into the combustion chamber.

The engine 22 includes a variable valve timing mechanism (hereinafter referred to as the electric VVT) 150. The electric VVT 150 is configured to continuously change an opening/closing timing VT of the intake valve 128 by use of electric power from an auxiliary battery (not shown).

An operation of the engine 22 is controlled by an engine electronic control unit (hereinafter referred to as the engine ECU) 24. Although not illustrated herein, the engine ECU 24 is configured as a microprocessor mainly constituted by a CPU. The engine ECU 24 includes a ROM for storing a processing program, a RAM for temporarily storing data, input/output ports, and a communication port, in addition to the CPU. Signals from various sensors necessary to control the operation of the engine 22 are input into the engine ECU 24 via the input port. The signals from various sensors include the following signals: a crank angle θcr from a crank position sensor 140 for detecting a rotation position of the crankshaft 26; a cooling-water temperature Tw from a water temperature sensor 142 for detecting a temperature of cooling water of the engine 22; cam angles θci, θco from a cam position sensor 144 that detects a rotation position of an intake cam shaft that opens/closes the intake valve 128 and a rotation position of an exhaust cam shaft that opens/closes an exhaust valve; a throttle opening degree TH from a throttle valve position sensor 146 that detects a position of the throttle valve 124; an intake-air amount Qa from an air flow meter 148 attached to an intake pipe; an intake temperature Ta from a temperature sensor 149 attached to the intake pipe; an intake pressure Pin from an intake pressure sensor 158 that detects a pressure inside the intake pipe; a catalyst temperature Tc from a temperature sensor 134b that detects a temperature of the catalyst 134a of the exhaust gas control apparatus 134; an air/fuel ratio AF from an air-fuel-ratio sensor 135a; an oxygen signal O2 from an oxygen sensor 135b; a knock signal Ks from a knock sensor 159 attached to a cylinder block so as to detect a vibration caused along with an occurrence of knocking; and an EGR valve opening degree EV from an EGR valve opening degree sensor 165 that detects an opening degree of the EGR valve 164. Various control signals for controlling the operation of the engine 22 are output from the engine ECU 24 via the output port. The various control signals include the following signals: a driving signal to a throttle motor 136 for adjusting a position of the throttle valve 124; a driving signal to the fuel injection valve 126; a control signal to an ignition coil 138 integrated with an igniter; a control signal to the electric VVT 150; and a driving signal to the stepping motor 163 that adjusts an opening degree of the EGR valve 164. The engine ECU 24 is connected to the HVECU 70 via the communication port. The engine ECU 24 controls the operation of the engine 22 by a control signal from the HVECU 70. Further, the engine ECU 24 outputs data about an operating state of the engine 22 to the HVECU 70 as needed. The engine ECU 24 calculates a rotation number of the crankshaft 26, that is, a rotation number Ne of the engine 22 based on a crank angle θcr from the crank position sensor 140. Further, the engine ECU 24 calculates an opening/closing timing VT of the intake valve 128, based on an angle (θci−θcr) of a cam angle θci of the intake cam shaft from the cam position sensor 144 with respect to the crank angle θcr from crank position sensor 140.

The planetary gear 30 is configured as a single pinion-type planet gear mechanism. A rotator of the motor MG1 is connected to a sun gear of the planetary gear 30. A drive shaft 36 connected to driving wheels 38a, 38b via a differential gear 37 and a rotator of the motor MG2 are connected to a ring gear of the planetary gear 30. The crankshaft 26 of the engine 22 is connected to a carrier of the planetary gear 30.

The motor MG1 is configured as a synchronous generator-motor (an example of a generator), for example. The rotator of the motor MG1 is connected to the sun gear of the planetary gear 30, as described above. The motor MG2 is configured as a synchronous generator-motor (an example of a motor), for example. The rotator of the motor MG2 is connected to the drive shaft 36, as described above. The inverters 41, 42 are connected to a power line 54 together with the battery 50. The motors MG1, MG2 are rotationally driven such that switching of switching elements (not shown) of the inverters 41, 42 is controlled by a motor electronic control unit (hereinafter referred to as the motor ECU) 40.

Although not illustrated herein, the motor ECU 40 is configured as a microprocessor mainly constituted by a CPU, and includes a ROM for storing a processing program, a RAM for temporarily storing data, input/output ports, and a communication port, in addition to the CPU. Signals from various sensors necessary to control the drive of the motors MG1, MG2 are input into the motor ECU 40 via the input port. The signals from various sensors include the following signals: rotation positions θm1, θm2 from rotational position detecting sensors 43, 44 that detect rotation positions of the rotators of the motors MG1, MG2; and phase currents from a current sensor that detects currents flowing through respective phases of the motors MG1, MG2. From the motor ECU 40, switching control signals to switching elements (not shown) of the inverters 41, 42 are output via the output port. The motor ECU 40 is connected to the HVECU 70 via the communications port. The motor ECU 40 drive-controls the motors MG1, MG2 by a control signal from the HVECU 70. Further, the motor ECU 40 outputs data about driving states of the motor MG1, MG2 to the HVECU 70 as needed. The motor ECU 40 calculates rotation numbers Nm1, Nm2 of the motors MG1, MG2 based on the rotation positions θm1, θm2 of the rotators of the motors MG1, MG2 from the rotational position detecting sensors 43, 44.

The battery 50 is configured as a lithium-ion secondary battery or a nickel metal hydride secondary battery, for example, and is connected to the inverters 41, 42 via a power line 54. The battery 50 is managed by a battery electronic control unit (referred to as a battery ECU) 52.

Although not illustrated herein, the battery ECU 52 is configured as a microprocessor mainly constituted by a CPU, and includes a ROM for storing a processing program, a RAM for temporarily storing data, input/output ports, and a communication port, in addition to the CPU. Signals from various sensors necessary to manage the battery 50 are input into the battery ECU 52 via the input port. The signals from various sensors include the following signals: a battery voltage Vb from a voltage sensor 51a set between terminals of the battery 50; a battery current Ib from a current sensor 51b attached to an output terminal of the battery 50; and a battery temperature Tb from a temperature sensor 51c attached to the battery 50. The battery ECU 52 is connected to the HVECU 70 via the communication port. The battery ECU 52 outputs data about a state of the battery 50 to the HVECU 70 as needed. The battery ECU 52 calculates a state of charge SOC based on an integrated value of the battery current Ib from the current sensor 51b. The state of charge SOC indicates a ratio of a capacity of electric power that can be discharged from the battery 50, relative to a full capacity of the battery 50. Further, the battery ECU 52 calculates input and output limits Win, Wout based on the state of charge SOC thus calculated and the battery temperature Tb from the temperature sensor 51c. The input and output limits Win, Wout are maximum permissible powers with which the battery 50 may be charged and discharged.

Although not illustrated herein, the HVECU 70 is configured as a microprocessor mainly constituted by a CPU, and includes a ROM for storing a processing program, a RAM for temporarily storing data, input/output ports, and a communication port, in addition to the CPU. Signals from various sensors are input into the HVECU 70 via the input port. The signals from various sensors include the following signals: an ignition signal from an ignition switch 80; a shift position SP from a shift position sensor 82 that detects an operation position of a shift lever 81; an accelerator opening degree Acc from an accelerator pedal position sensor 84 that detects a stepping amount of an accelerator pedal 83; a brake pedal position BP from a brake pedal position sensor 86 that detects a stepping amount of a brake pedal 85; a vehicle speed V from a vehicle speed sensor 88; and an acceleration G of the vehicle from an acceleration sensor 89. As described above, the HVECU 70 is connected to the engine ECU 24, the motor ECU 40, and the battery ECU 52 via the communications port. The HVECU 70 exchanges various control signals and data with the engine ECU 24, the motor ECU 40, and the battery ECU 52.

The hybrid vehicle 20 configured as such in the embodiment runs in running modes such as a hybrid running mode (HV running mode) and an electric running mode (EV running mode). The HV running mode is a running mode in which the hybrid vehicle 20 runs along with the operation of the engine 22. The EV running mode is a running mode in which the hybrid vehicle 20 runs with the operation of the engine 22 being stopped.

Figure 3:
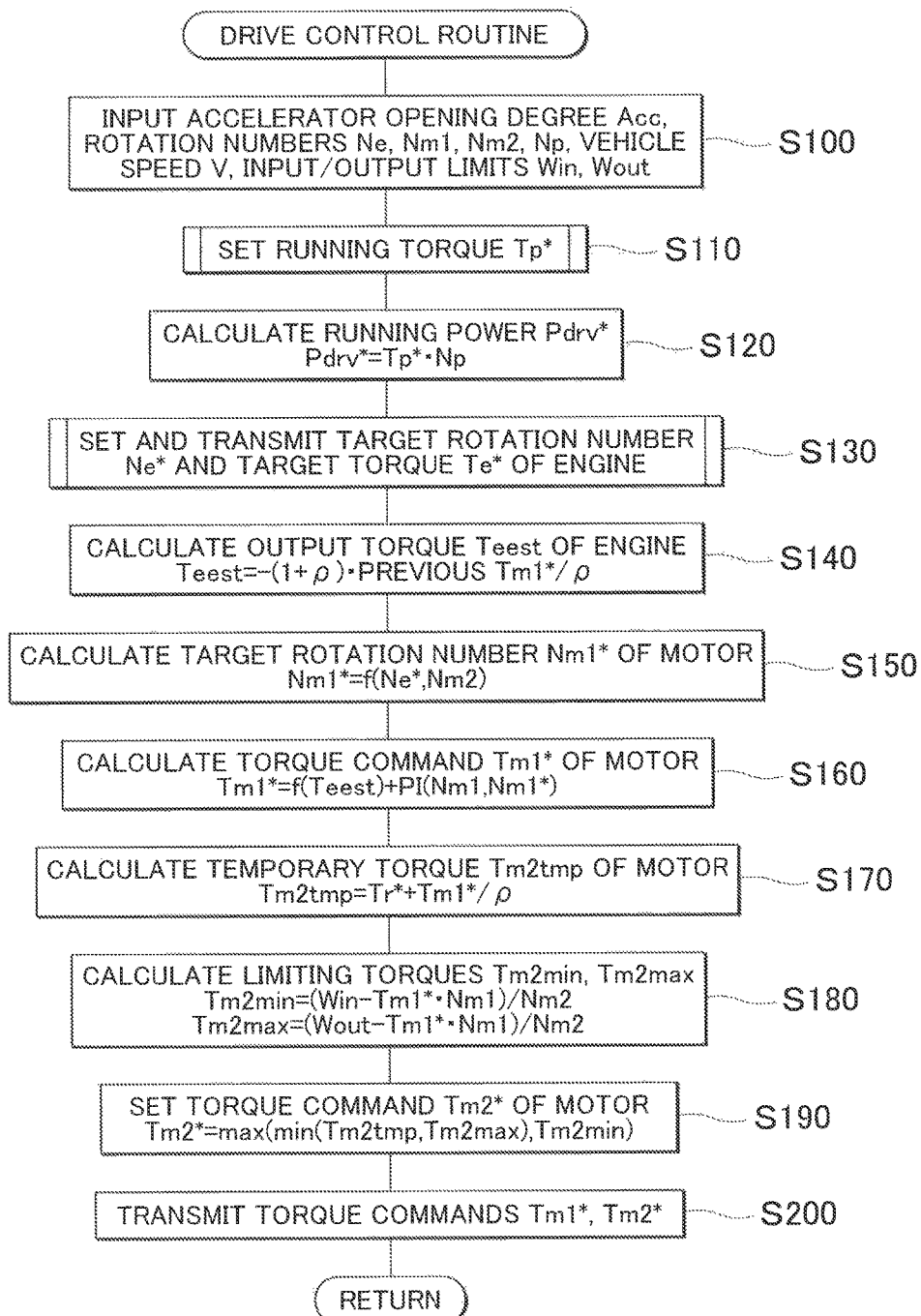
FIG. 3 is a flowchart illustrating one example of a drive control routine executed by a HVECU 70 according to the above embodiment.

Next will be described an operation of the hybrid vehicle 20 configured as such in the embodiment, particularly, an operation at the time when the hybrid vehicle 20 runs in the HV running mode. FIG. 3 is a flowchart illustrating one example of a drive control routine executed by the HVECU 70 according to the embodiment. This routine is executed repeatedly every predetermined time (e.g., for every few msec) at the time when the hybrid vehicle 20 runs in the HV running mode.

When the drive control routine is executed, the HVECU 70 initially inputs data such as an accelerator opening degree Acc, a vehicle speed V, a rotation number Ne of the engine 22, rotation numbers Nm1, Nm2 of the motors MG1, MG2, a rotation number Np of the drive shaft 36, a state of charge SOC of the battery 50, and input and output limits Win, Wout (step S100). Here, as the accelerator opening degree Acc, a value detected by the accelerator pedal position sensor 84 is input. As the vehicle speed V, a value detected by the vehicle speed sensor 88 is input. As the rotation number Ne of the engine 22, a value calculated by the engine ECU 24 is input via communication. As the rotation numbers Nm1, Nm2 of the motors MG1, MG2, values calculated by the motor ECU 40 are input via communication. As the rotation number Np of the drive shaft 36, the rotation number Nm2 of the motor MG2 or a rotation number obtained by multiplying the vehicle speed V by a factor of conversion is input. As the state of charge SOC of the battery 50 and the input and output limits Win, Wout, values calculated by the battery ECU 52 are input via communication.

Subsequently, by the after-mentioned first setting routine, a running torque Tp* of the drive shaft 36 is set (step S110). Then, a running power Pdrv* required to the drive shaft 36 is calculated by multiplying the running torque Tp* by the rotation number Np of the drive shaft 36 (step S120). Subsequently, by the after-mentioned second setting routine, a target rotation number Ne* and a target torque Te* of the engine 22 are set and then transmitted to the engine ECU 24 (step S130). Although details will be described later, the HVECU 70 also sets a necessary advance amount ΔVT of the opening/closing timing of the intake valve 128 as heeded and transmits it to the engine ECU 24. A control of the engine 22 by the engine ECU 24 will be described later.

Figure 4:
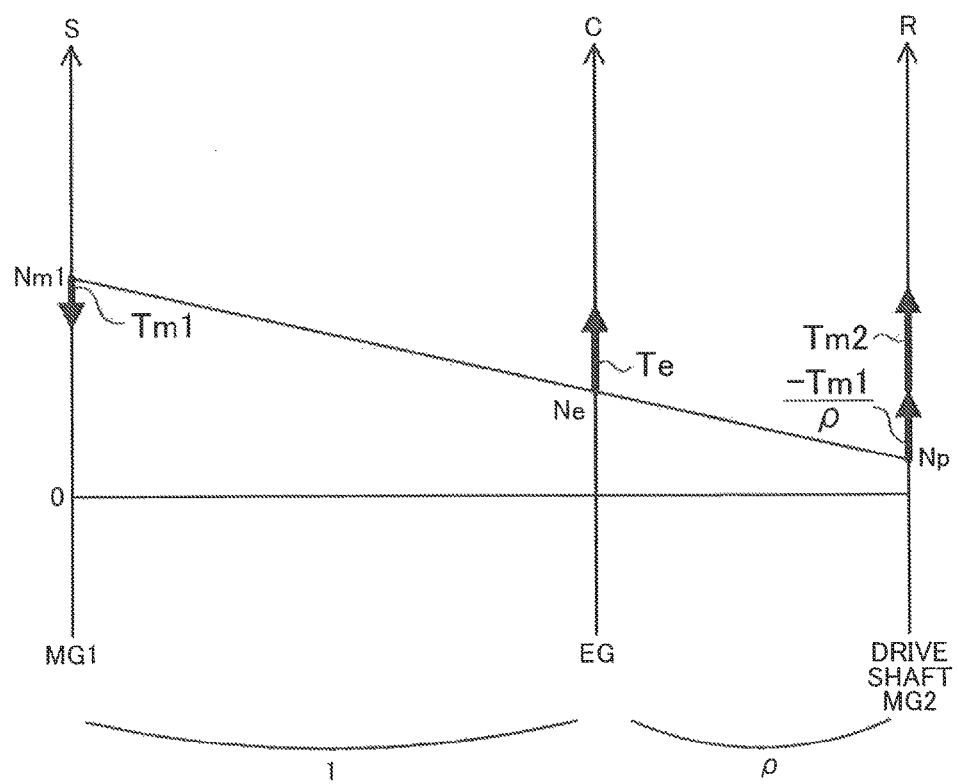
FIG. 4 is an explanatory view illustrating one example of a collinear diagram illustrating a dynamic relationship between a rotation number and a torque in a rotating element of a planetary gear 30 at the time of running in a HV running mode according to the above embodiment.

Then, by use of a torque command (previous Tm1*) of the motor MG1, which is set at the time when this routine is executed previously, and a gear ratio (the number of teeth of the sun gear/the number of teeth of the ring gear) ρ of the planetary gear 30, an output torque Teest that is estimated to be output from the engine 22 is calculated according to Formula (1) (step S140). FIG. 4 is an explanatory view illustrating one example of a collinear diagram illustrating a dynamic relationship between a rotation number and a torque in a rotating element of the planetary gear 30 at the time of running in the HV running mode. In the figure, an S axis on the left indicates a rotation number of the sun gear, which is the rotation number Nm1 of the motor MG1, a C axis indicates a rotation number of the carrier, which is the rotation number Ne of the engine 22, and an R axis indicates the rotation number Np of the ring gear (the drive shaft 36), which is the rotation number Nm2 of the motor MG2. Further, in the figure, two bold arrows on the R axis indicate a torque output from the motor MG1 so as to act on the drive shaft 36 via the planetary gear 30, and a torque output from the motor MG2 so as to act on the drive shaft 36. With the use of the collinear diagram, Formula (1) can be easily obtained.

$$T_{eest} = -(1+\rho) \cdot \text{previous } Tm1^*/\rho \quad (1)$$

Subsequently, by use of the target rotation number Ne* of the engine 22, the rotation number Np of the drive shaft 36, and the gear ratio ρ of the planetary gear 30, a target rotation number Nm1* of the motor MG1 is calculated according to Formula (2) (step S150). Then, by use of the target rotation number Nm1* of the motor MG1, a current rotation number Nm1 of the motor MG1, the output torque Teest of the engine 22, and the gear ratio ρ of the planetary gear 30, a torque command Tm1* of the motor MG1 is calculated according to Formula (3) (step S160). With the use of the collinear diagram of FIG. 4, Formula (2) can be easily obtained. Formula (3) is a relational expression in a feedback control to rotate the motor MG1 at the target rotation number Nm1* (to rotate the engine 22 at the target rotation number Ne*). In Formula (3), the first term on the right side is a feedforward term, and the second term and the third term on the right side are a proportional term and an integration term of the feedback. The first term on the right side is a torque to cause the motor MG1 to receive a torque that is output from the engine 22 so as to act on a rotating shaft of the motor MG1 via the planetary gear 30. "k1" of the second term on the right side is a gain of the proportional term, and "k2" of the third term on the right side is a gain of the integration term.

$$Nm1^* = Ne \cdot (1+\rho)/\rho - Np/\rho \qquad (2)$$

$$Tm1^* = -\rho \cdot Teest/(1+\rho) + k1(Nm1^*-Nm1) + k2\int (Nm1^*-Nm1)dt \qquad (3)$$

As illustrated in Formula (4), a torque ($-Tm1^*/\rho$) is subtracted from a required torque $Tr^*$, so as to calculate a temporary torque Tm2tmp as a base value of a torque command Tm2* of the motor MG2 (step S170). The torque ($-Tm1^*/\rho$) is a torque output from the motor MG1 so as to act on the drive shaft 36 via the planetary gear 30 at the time when the motor MG1 is driven by the torque command Tm1*. Subsequently, as shown in Formula (5) and Formula (6), a power consumption (a generated electric power) of the motor MG1, provided as a product of the torque command Tm1* and the rotation number Nm1 of the motor MG1 is subtracted from each of the input and output limits Win, Wout of the battery 50, and then further divided by the rotation number Nm2 of the motor MG2, so as to calculate limiting torques Tm2min, Tm2max of the motor MG2 (step S180). Then, as shown in Formula (7), the temporary torque Tm2tmp of the motor MG2 is limited by the limiting torques Tm2min, Tm2max, so as to set a torque command Tm2* of the motor MG2 (step S190).

$$Tm2\text{tmp} = Tr^* + Tm1^*/\rho \qquad (4)$$

$$Tm2\min = (Win - Tm1^* \cdot Nm1)/Nm2 \qquad (5)$$

$$Tm2\max = (Wout - Tm1^* \cdot Nm1)/Nm2 \qquad (6)$$

$$Tm2^* = \max(\min(Tm2\text{tmp}, Tm2\max), Tm2\min) \qquad (7)$$

Then, the torque commands Tm1*, Tm2* of the motors MG1, MG2 are transmitted to the motor ECU 40 (step S200), and the routine is finished. When the motor ECU 40 receives the torque commands Tm1*, Tm2* of the motors MG1, MG2, the motor ECU 40 performs a switching control on the switching elements of the inverters 41, 42 so that the motors MG1, MG2 are driven by the torque commands Tm1*, Tm2*. By performing such a control, it is possible to perform running by outputting the running torque Tp* (a running power Pdrv*) to the drive shaft 36 within a range of the input and output limits Win, Wout of the battery 50 while the engine 22 is operated.

Next will be described a process of step S110 of the drive control routine in FIG. 3, that is, a process of setting the running torque Tp* of the drive shaft 36 according to the first setting routine in FIG. 5.

Figure 5:
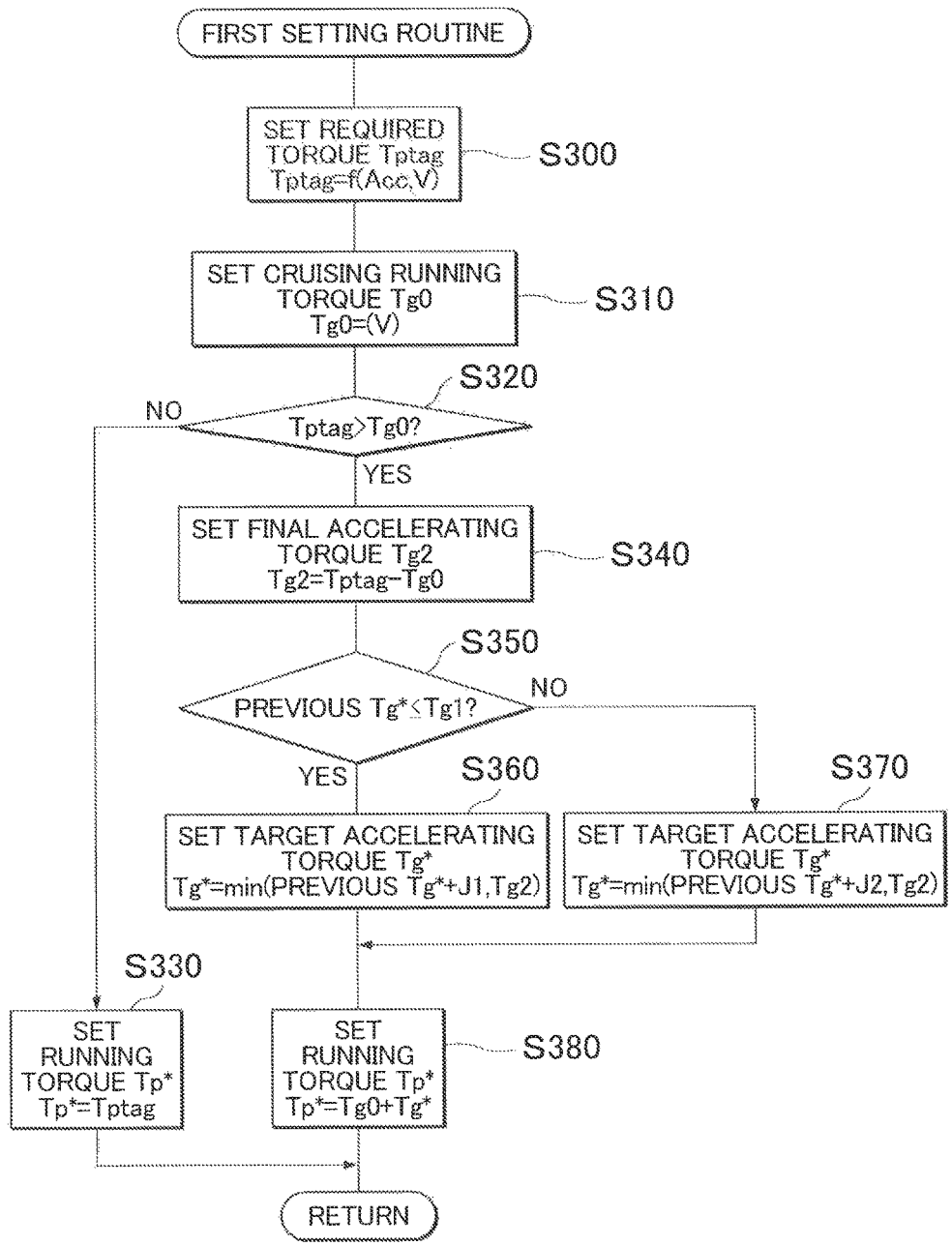
FIG. 5 is a flowchart illustrating one example of a first setting routine executed by the HVECU 70 according to the above embodiment.

In the first setting routine in FIG. 5, the HVECU 70 initially sets a required torque Tptag that is required to the drive shaft 36 based on an accelerator opening degree Acc and a vehicle speed V (step S300). Further, based on the vehicle speed V, a cruising running torque Tg0 as a torque for cruising running (a torque corresponding to a road load) is set (step S310).

Figure 6:
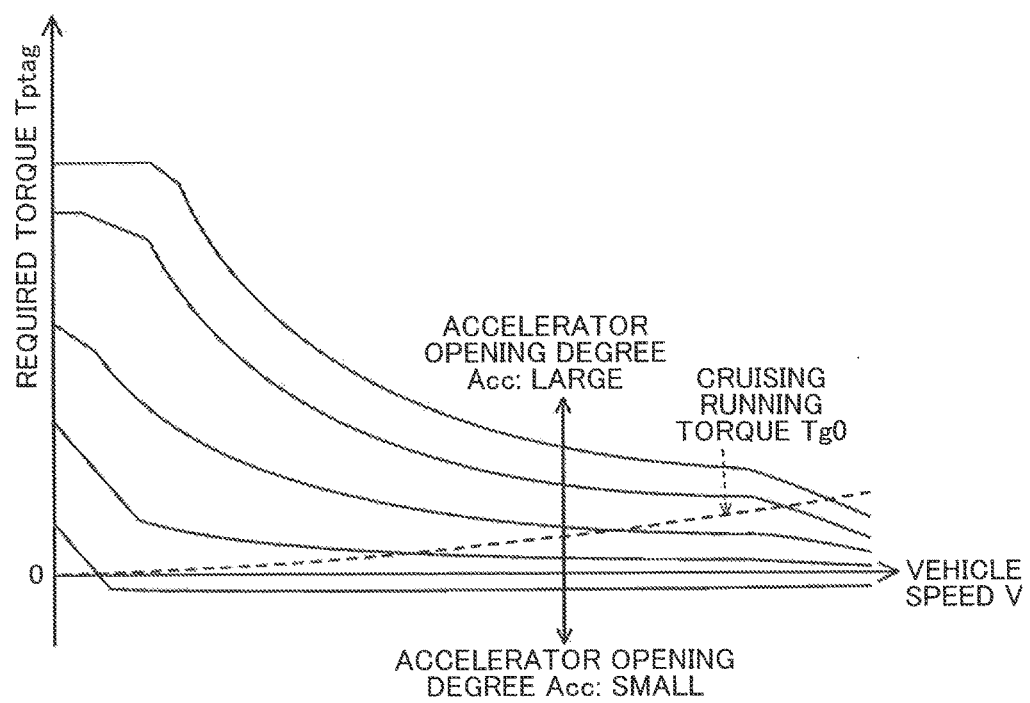
FIG. 6 is an explanatory view illustrating one example of a relationship among an accelerator opening degree Acc, a vehicle speed V, and a required torque Tptag, and a relationship between a vehicle speed V and a cruising running torque Tg0, according to the above embodiment.

Here, in the embodiment, the required torque Tptag is set such that a relationship among the accelerator opening degree Ace, the vehicle speed V, and the required torque Tptag is determined in advance and stored in a ROM (not shown), and when an accelerator opening degree Acc and a vehicle speed V are given, a corresponding required torque Tptag is derived from this relationship. Further, in the embodiment, the cruising running torque Tg0 is set such that a relationship between the vehicle speed V and the cruising running torque Tg0 is determined in advance and stored in a ROM (not shown), and when a vehicle speed V is given, a corresponding cruising running torque Tg0 is derived from this relationship. Examples of the relationship among the accelerator opening degree Ace, the vehicle speed V, and the required torque Tptag, and the relationship between the vehicle speed V and the cruising running torque Tg0 are illustrated in FIG. 6. As illustrated herein, the required torque Tptag is set to have a tendency that the required torque Tptag increases as the accelerator opening degree Ace increases, and the required torque Tptag decreases as the vehicle speed V increases. Further, as illustrated herein, the cruising running torque Tg0 is set to have a tendency that the cruising running torque Tg0 increases as the vehicle speed V increases.

Then, the required torque Tptag is compared with the cruising running torque Tg0 (step S320). This process is a process of determining whether or not the acceleration of the vehicle is required. When the required torque Tptag is the cruising running torque Tg0 or less, it is determined that the acceleration of the vehicle is not required. Then, the required torque Tptag is set to the running torque Tp* (step S330), and the routine is finished.

When the required torque Tptag is larger than the cruising running torque Tg0 in step S320, it is determined that the acceleration of the vehicle is required. The cruising running torque Tg0 is subtracted from the required torque Tptag, so as to calculate a final accelerating torque Tg2 (step S340).

Subsequently, a previous target accelerating torque (previous Tg*) is compared with a positive threshold Tg1 (step S350). A detail of the threshold Tg1 will be described later. When the previous target accelerating torque (previous Tg*) is the threshold Tg1 or less, upper limit guard is performed by the final accelerating torque Tg2 on a value obtained by adding a first rate value J1 to the previous target accelerating torque (previous Tg*) as shown in Formula (8), so as to set a target accelerating torque Tg* (step S360). Then, a running torque Tp* is set by adding the target accelerating torque Tg* to the cruising running torque Tg0 (step S380), and the routine is finished.

$$Tg^* = \min(\text{previous } Tg^* + J1, Tg2) \qquad (8)$$

Accordingly, when the required torque Tptag is larger than the cruising running torque Tg0 and the previous target accelerating torque (previous Tg*) is the threshold Tg1 or less, the target accelerating torque Tg* is increased (to be closer) to the final accelerating torque Tg2 by the first rate value J1 every execution of the routine, that is, the running torque Tp* is increased (to be closer) to the required torque Tptag by the first rate value J1 every execution of the routine. Here, as the first rate value J1, a fixed value (a uniform value) may be used or a value corresponding to the vehicle speed V, the final accelerating torque Tg2, or the like may be used.

In step S350, when the previous target accelerating torque (previous Tg*) is larger than the threshold Tg1, upper limit guard is performed by the final accelerating torque Tg2 on a value obtained by adding a second rate value J2 to the previous target accelerating torque (previous Tg*) as shown in Formula (9), so as to set a target accelerating torque Tg* (step S370). The second rate value J2 is smaller than the first rate value J1. Then, a running torque Tp* is set by adding the target accelerating torque Tg* to the cruising running torque Tg0 (step S380), and the routine is finished.

$$Tg^* = \min(\text{previous } Tg^* + J2, Tg2) \qquad (9)$$

Accordingly, when the required torque Tptag is larger than the cruising running torque Tg0 and the previous target accelerating torque (previous Tg*) is larger than the threshold Tg1, the target accelerating torque Tg* is increased (to be closer) to the final accelerating torque Tg2 by the second rate value J2 every execution of the routine, that is, the running torque Tp* is increased (to be closer) to the required torque Tptag by the second rate value J2 every execution of the routine. Here, as the second rate value J2, a fixed value (a uniform value) may be used or a value corresponding to the vehicle speed V, the final accelerating torque Tg2, or the like may be used.

The threshold Tg1 (torque (Tg0+Tg1)) is a threshold used to change an increase rate of the target accelerating torque Tg* (the running torque Tp*) from the first rate value J1 to the second rate value J2. As the threshold Tg1, a fixed value (a uniform value) may be used or a value corresponding to the vehicle speed V, the final accelerating torque Tg2, or the like may be used.

Figure 7:
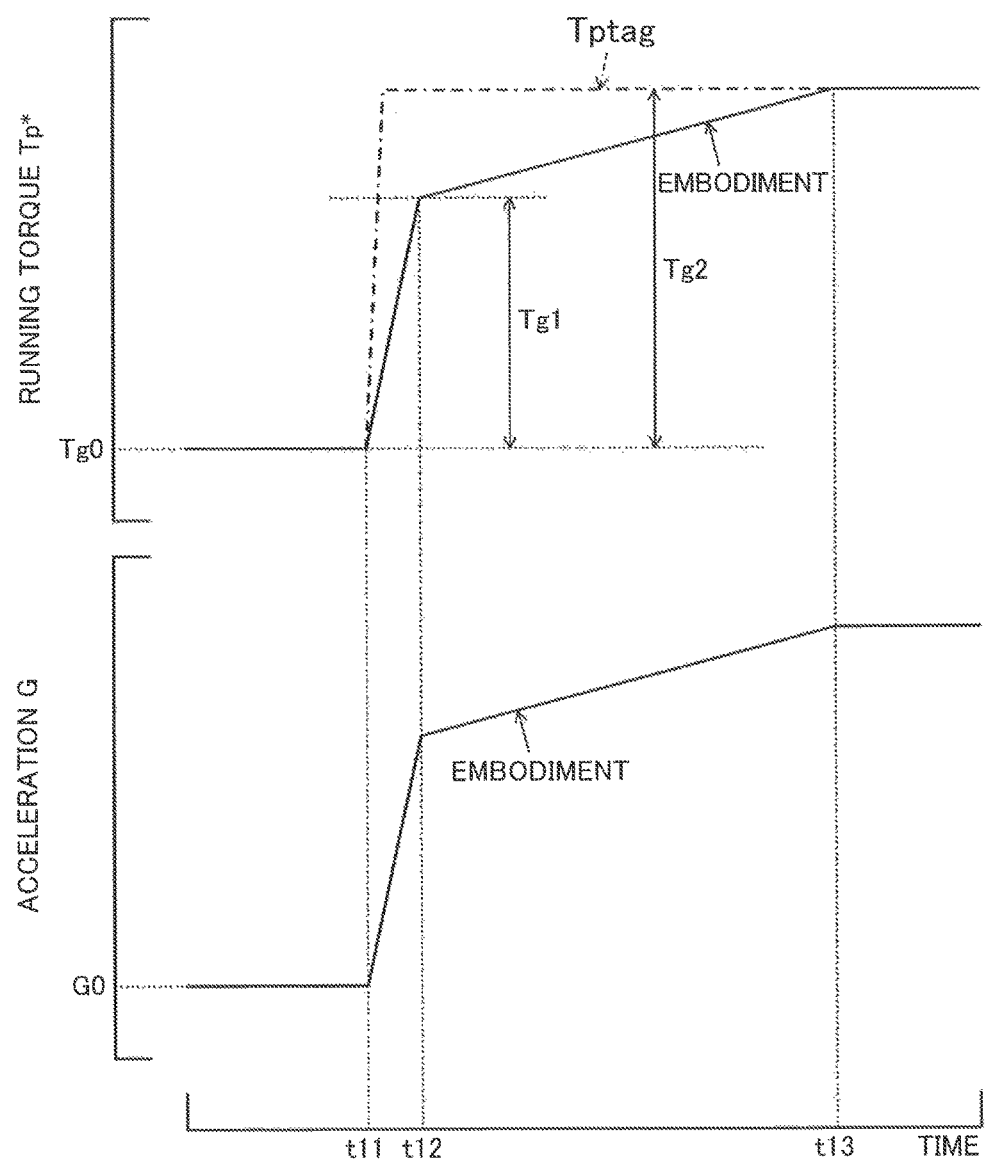
FIG. 7 is an explanatory view illustrating one example of a state of respective time changes of a running torque Tp* and an acceleration G of a vehicle at the time when the required torque Tptag becomes larger than a torque (Tg0+Tg1), according to the above embodiment.

FIG. 7 is an explanatory view illustrating one example of a state of respective time changes of the running torque Tp* and an acceleration G of the vehicle at the time when the required torque Tptag is larger than a torque (Tg0+Tg1) as a sum of the cruising running torque Tg0 and the threshold Tg1. As illustrated in the figure, when the required torque Tptag becomes larger than the torque (Tg0+Tg1) at a time t11, the running torque Tp* is increased to the torque (Tg0+Tg1) by use of the relatively large first rate value J1 (from a time t11 to a time t12), and then, the running torque Tp* is increased to the required torque Tptag (=Tg0+Tg2) by use of the second rate value J2, which is smaller than the first rate value J1 (from a time t12 to a time t13). Hereby, a sufficient acceleration feeling can be achieved until the running torque Tp* reaches the torque (Tg0+Tg1), and a sufficient extension feeling can be achieved until the running torque Tp* reaches the required torque Tptag after the running torque Tp* has reached the torque (Tg0+Tg1). As a result, a well-controlled acceleration feeling (a sufficient acceleration feeling in the first half and an extension feeling in the second halt) can be achieved as a total acceleration feeling until the running torque Tp* reaches the required torque Tptag (the target acceleration torque Tg* reaches the final accelerating torque Tg2). That is, a good acceleration feeling can be given to the driver.

Next will be described a process of step S130 of the drive control routine in FIG. 3, that is, a process of setting the target rotation number Ne*, the target torque Te*, and the like of the engine 22 by the second setting routine in FIG. 8A and FIG. 8B.

Figure 8A:
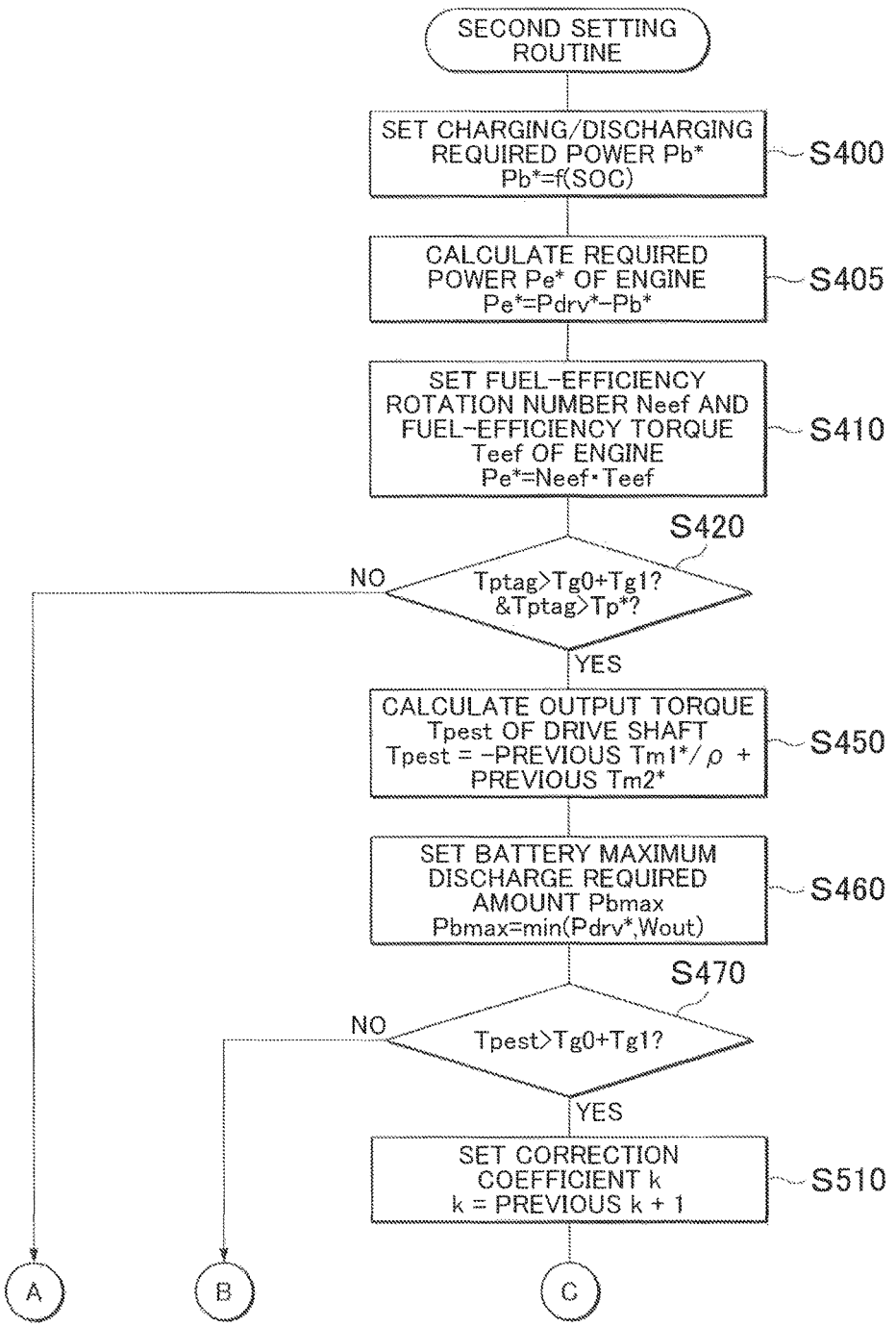
FIG. 8A and FIG. 8B indicate a flowchart illustrating one example of a second setting routine executed by the HVECU 70 according to the above embodiment.
Figure 8B:
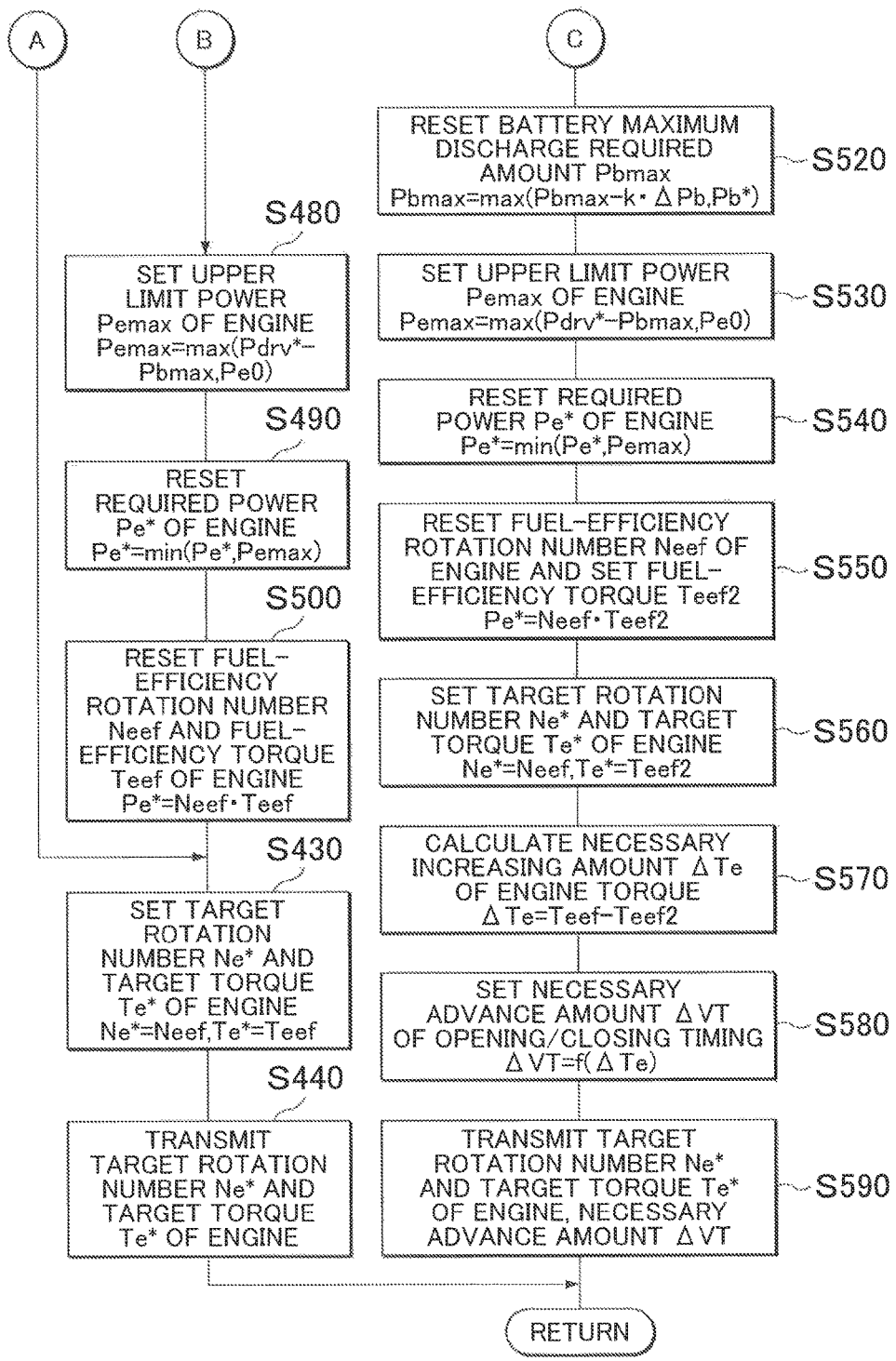

When the second setting routine is executed in FIG. 8A and FIG. 8B, the HVECU 70 initially sets a charging/discharging required power Pb* (a positive value at the time when the battery 50 discharges) of the battery 50 based on a state of charge SOC of the battery 50 (step S400). Here, the charging/discharging required power Pb* of the battery 50 is set as follows. When the state of charge SOC of the battery 50 is a target ratio SOC* (e.g., 55%, 60%, 65%), a value of 0 is set to the charging/discharging required power Pb*. When the state of charge SOC is larger than the target ratio SOC*, a positive value (a value on a discharge side) within a range of the output limit Wout of the battery 50 is set to the charging/discharging required power Pb*. When the state of charge SOC is smaller than the target ratio SOC*, a negative value (a value on a charge side) within a range of the input limit Win of the battery 50 is set to the charging/discharging required power Pb*.

When the charging/discharging required power Pb* of the battery 50 is set as such, a required power Pe* required to the engine 22 is calculated by subtracting the charging/discharging required power Pb* of the battery 50 from a running power Pdrv* (step S405).

Figure 9:
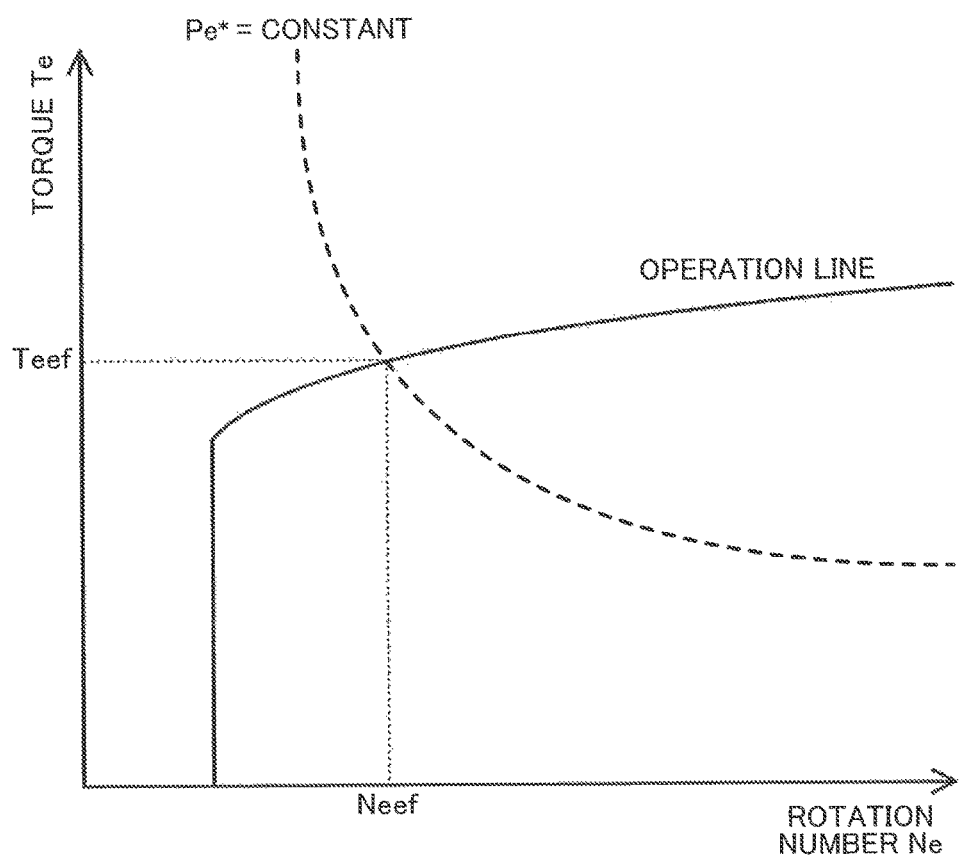
FIG. 9 is an explanatory view illustrating one example of an operation line of the engine 22 and a state of setting a fuel-efficiency rotation number Neef and a fuel-efficiency torque Teef, according to the above embodiment.

Subsequently, a fuel-efficiency rotation number Neef and a fuel-efficiency torque Teef of the engine 22 are set based on the required power Pe* of the engine 22 and an operation line to operate the engine 22 efficiently (step S410). FIG. 9 is an explanatory view illustrating one example of the operation line of the engine 22 and a state of setting the fuel-efficiency rotation number Neef and the fuel-efficiency torque Teef. The fuel-efficiency rotation number Neef and the fuel-efficiency torque Teef of the engine 22 can be obtained as an intersection between the operation line of the engine 22 and a curved line on which the required power Pe* is constant.

Then, the required torque Tptag is compared with the torque (Tg0+Tg1) and the running torque Tp* (step S420). Here, the comparison between the required torque Tptag and the torque (Tg0+Tg1) is performed to determine whether or not the driver requests a relatively large acceleration. That is, the torque (Tg0+Tg1) is a threshold used to determine whether or not the driver requests a relatively large acceleration, and is also a threshold used to change an increase rate of the running torque Tp* from the first rate value J to the second rate value J2 as described above. Further, the comparison between the required torque Tptag and the running torque Tp* is performed to determine whether or not the running torque Tp* is being increased to the required torque Tptag.

In step S420, when the required torque Tptag is the torque (Tg0+Tg1) or less or when the required torque Tptag is equal to the running torque Tp*, it is determined that the driver does not request a relatively large acceleration or it is determined that the running torque Tp* is not being increased to the required torque Tptag. Then, the fuel-efficiency rotation number Neef and the fuel-efficiency torque Teef of the engine 22 are set to the target rotation number Ne* and the target torque Te* of the engine 22 (step S430). After that, the target rotation number Ne* and the target torque Te* of the engine 22, both set as described above, are transmitted to the engine ECU 24 (step S440), and the routine is finished.

When the engine ECU 24 receives the target rotation number Ne* and the target torque Te* of the engine 22 (in this case, the fuel-efficiency rotation number Neef and the fuel-efficiency torque Teef set in step S410), the engine ECU 24 performs an intake-air amount control, a fuel injection control, an ignition control, an opening/closing timing control, and the like on the engine 22 based on the target rotation number Ne* and the target torque Te* thus received. Initially, in order that the engine 22 can be operated efficiently at an operation point constituted by the target rotation number Ne* and the target torque Te*, a target opening/closing timing VT* of the intake valve 128 is set. Subsequently, in order that the engine 22 can be operated efficiently at the operation point constituted by the target rotation number Ne* and the target torque Te*, a target throttle opening degree TH*, a target fuel injection amount Qf*, and a target ignition timing IT* are set by use of the target opening/closing timing VT*. The tendencies of the target opening/closing timing VT*, the target throttle opening degree TH*, the target fuel injection amount Qf*, and the target ignition timing IT* in this case are well known, so detailed descriptions thereof are omitted herein. Then, the intake-air amount control is performed by drive-controlling the throttle motor 136 so that a throttle opening degree TH reaches the target throttle opening degree TH*. The fuel injection control is performed by drive-controlling the fuel injection valve 126 so that the fuel injection is performed at the target fuel injection amount Qf*. The ignition control is performed by drive-controlling the ignition coil 138 so that ignition is performed at the target ignition timing IT*. The opening/closing timing control is performed by drive-controlling the electric VVT 150 so that an opening/closing timing VT of the intake valve 128 is the target opening/closing timing VT*.

In step S420, when the required torque Tptag is larger than the torque (Tg0+Tg1) and the required torque Tptag is larger than the running torque Tp*, it is determined that the driver requests a relatively large acceleration and it is determined that the running torque Tp* is being increased to the required torque Tptag. Then, by use of the torque commands (previous Tm1*), (previous Tm2*) of the motors MG1, MG2, which are set at the time when the drive control routine in FIG. 3 is executed previously, and the gear ratio ρ of the planetary gear 30, an output torque Tpest that is estimated to be output from the drive shaft 36 is calculated according to Formula (10) (step S450). With the use of the collinear diagram of FIG. 4, Formula (10) can be easily obtained.

$$Tpest = -\text{previous } Tm1^*/\rho + \text{previous } Tm2^* \quad (10)$$

Subsequently, as shown in Formula (11), a smaller one of the running power Pdrv* and the output limit Wout of the battery 50 is set to a maximum discharge required amount Pbmax of the battery 50 (step S460).

$$Pbmax = \min(Pdrv^*, Wout) \quad (11)$$

Then, the output torque Tpest of the drive shaft 36 is compared with the torque (Tg0+Tg1) (step S470). When the output torque Tpest of the drive shaft 36 is the torque (Tg0+Tg1) or less, an upper limit power Pemax of the engine 22 is calculated by performing lower limit guard by a power Pe0 on a value obtained by subtracting the maximum discharge required amount Pbmax of the battery 50 from the running power Pdrv*, as shown in Formula (12) (step S480). Here, a value (Pdrv*−Pbmax) of Formula (12) is a power of larger one of a value of 0 and a value (Pdrv*−Wout) obtained by subtracting the output limit Wout of the battery 50 from the running power Pdrv*, in consideration of step S460. The value (Pdrv*−Pbmax) is one example of a first power. Further, the power Pe0 used herein is a required power Pe* of the engine 22 right before the required torque Tptag becomes larger than the torque (Tg0+Tg1), that is, right before the driver requests a relatively large acceleration.

$$Pemax = \max(Pdrv^* - Pbmax, Pe0) \quad (12)$$

When the upper limit power Pemax of the engine 22 is set as such, the required power Pe* set in step S405 is limited by the upper limit power Pemax as shown in Formula (13), so as to reset the required power Pe* of the engine 22 (step S490). An increase of the required power Pe* can be limited by the upper limit power Pemax. Further, by the process of step S480 described above, the upper limit power Pemax is a value of the power Pe0 or more. Accordingly, the required power Pe* after the resetting can be set so as not to be smaller than the required power Pe* of the engine 22 right before the driver requests a relatively large acceleration.

Then, by use of the required power Pe* of the engine 22 after the resetting, a fuel-efficiency rotation number Neef and a fuel-efficiency torque Teef of the engine 22 are set, similarly to the process of step S410 described above (step S500). Subsequently, the processes of steps S430, S440 described above are executed so as to finish the routine.

$$Pe^* = \min(Pe^*, Pemax) \quad (13)$$

When the engine ECU 24 receives the target rotation number Ne* and the target torque Te* of the engine 22 (in this case, the fuel-efficiency rotation number Neef and the fuel-efficiency torque Teef reset in step S500), the engine ECU 24 performs an intake-air amount control, a fuel injection control, an ignition control, an opening/closing timing control, and the like on the engine 22 based on the target rotation number Ne* and the target torque Te* thus received.

When the output torque Tpest of the drive shaft 36 is larger than the torque (Tg0+Tg1) in step S470, a value of 1 is added to a previous correction factor (previous k) so as to set a correction coefficient k (step S510). Here, when the output torque Tpest of the drive shaft 36 is the torque (Tg0+Tg1) or less, a value of 0 is set to the correction coefficient k. Accordingly, the correction coefficient k is increased to a value of 1, a value of 2, . . . every time the output torque Tpest of the drive shaft 36 is determined to be larger than the torque (Tg0+Tg1) in step S470.

Subsequently, as shown in Formula (14), lower limit guard is performed by the charging/discharging required power Pb* of the battery 50 on a value obtained by subtracting a product of a predetermined value ΔPb and the correction coefficient k from the maximum discharge required amount Pbmax of the battery 50 which is set in step S460, so as to reset a maximum discharge required amount Pbmax of the battery 50 (step S520). This process is a process of gradually bringing the maximum discharge required amount Pbmax close to the charging/discharging required power Pb* every time the output torque Tpest of the drive shaft 36 is determined to be larger than the torque (Tg0+Tg1) in step S470.

$$Pbmax = \max(Pbmax - k \cdot \Delta Pb, Pb^*) \quad (14)$$

Then, similarly to the process of step S480 described above, an upper limit power Pemax of the engine 22 is set according to Formula (12) described above (step S530). In this case, the value (Pdrv*−Pbmax) in Formula (12) is a power gradually approaching a value (Pdrv*−Pb*) in consideration of steps S460, S520. The value (Pdrv*−Pbmax) in this case is one example of a second power. Further, the value (Pdrv*−Pb*) is one example of a third power.

Subsequently, similarly to the process of step S490, a required power Pe* of the engine 22 is reset (step S540). As described above, the maximum discharge required amount Pbmax gradually approaches the charging/discharging required power Pb* every time the output torque Tpest of the drive shaft 36 is determined to be larger than the torque (Tg0+Tg1) in step S470. Accordingly, the required power Pe* reset in step S540 gradually approaches a value set in step S405.

Subsequently, by use of the required power Pe* of the engine 22 after the resetting, a fuel-efficiency rotation number Neef and a fuel-efficiency torque Teef2 of the engine 22 are set, similarly to the process of step S410 (step S550). Here, the process of step S550 is different from the process of step S410 in that a rotation number and a torque at an intersection between the operation line of the engine 22 and the curved line on which the required power Pe* is constant are not the fuel-efficiency rotation number Neef and the fuel-efficiency torque Teef, but the fuel-efficiency rotation number Neef and the fuel-efficiency torque Teef2. In this case, the required power Pe* set in step S405 is one example of a temporary required power. The fuel-efficiency torque Teef set in step S410 is one example of a first temporary torque. Further, the required power Pe* reset in step S540 is one example of an after-limitation required power. The fuel-efficiency torque Teef2 set in step S550 is one example of a second temporary torque. Then, the fuel-efficiency rotation number Neef and the fuel-efficiency torque Teef2 of the engine 22 are set to the target rotation number Ne* and the target torque Te* of the engine 22 (step SS560).

Subsequently, as shown in Formula (15), a necessary increasing amount ΔTe of the torque of the engine 22 is calculated by subtracting the fuel-efficiency torque Teef2 set in step S550 from the fuel-efficiency torque Teef set in step S410 (step S570).

$$\Delta Te = Teef - Teef2 \tag{15}$$

Figure 10:
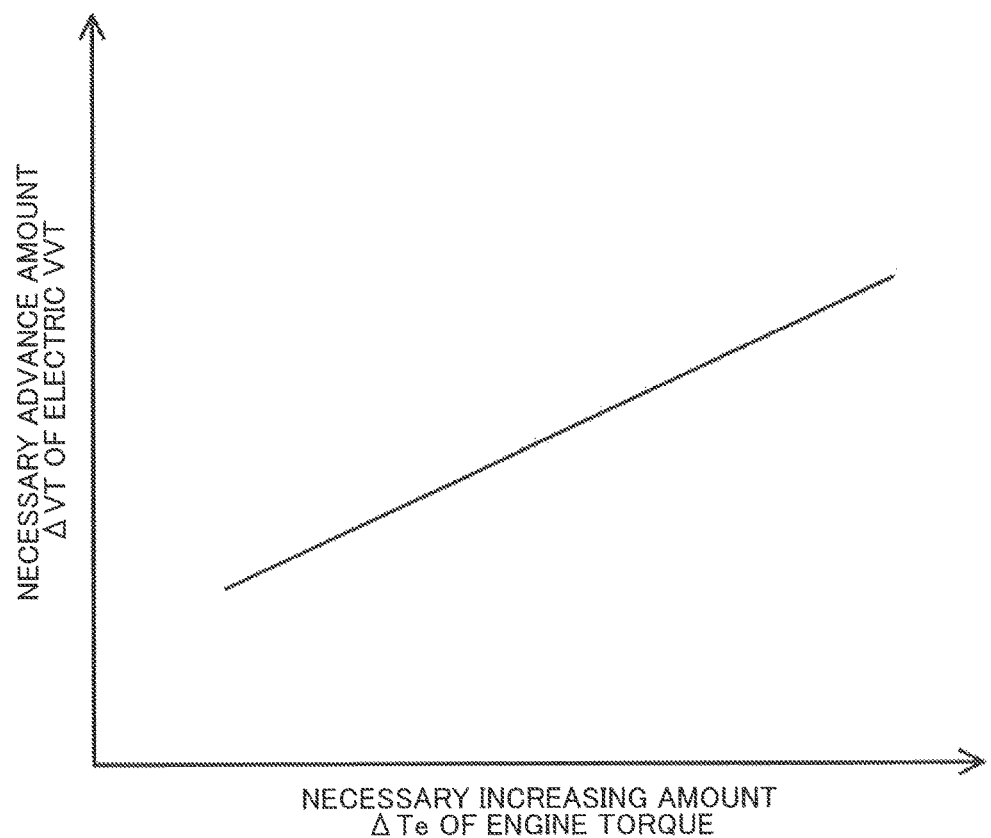
FIG. 10 is an explanatory view illustrating one example of a relationship between a necessary increasing amount ΔTe of a torque of the engine 22 and a necessary advance amount ΔVT according to the above embodiment.

When the necessary increasing amount ΔTe of the torque of the engine 22 is calculated as such, a necessary advance amount ΔVT of the opening/closing timing of the intake valve 128 is set based on the necessary increasing amount ΔTe thus calculated (step S580). Here, the necessary advance amount ΔVT just advances the opening/closing timing of the intake valve 128 relative to a timing to operate the engine 22 efficiently based on the target rotation number Ne* and the target torque Te* (the fuel-efficiency rotation number Neef and the fuel-efficiency torque Teef2). The necessary advance amount ΔVT is set such that a relationship between the necessary increasing amount ΔTe of the torque of the engine 22 and the necessary advance amount ΔVT is set in advance and stored in a ROM (not shown), and when a necessary increasing amount ΔTe is given, a necessary advance amount ΔVT is derived from this relationship. One example of the relationship between the necessary increasing amount ΔTe of the torque of the engine 22 and the necessary advance amount ΔVT is illustrated in FIG. 10. The necessary advance amount ΔVT is set to have a tendency that the necessary advance amount ΔVT increases as the necessary increasing amount Te increases, as illustrated herein.

Then, when the target rotation number Ne* and the target torque Te* of the engine 22 and the necessary advance amount ΔVT are set, the target rotation number Ne* and the target torque Te* of the engine 22 and the necessary advance amount ΔVT of the opening/closing timing of the intake valve 128 are transmitted to the engine ECU 24 (step S590), and the routine is finished.

When the engine ECU 24 receives the target rotation number Ne* and the target torque Te* of the engine 22 (in this case, the fuel-efficiency rotation number Neef and the fuel-efficiency torque Teef2 set in step S550) and the necessary advance amount ΔVT of the opening/closing timing of the intake valve 128, the engine ECU 24 performs an intake-air amount control, a fuel injection control, an ignition control, an opening/closing timing control, and the like on the engine 22 based on the received target rotation number Ne*, the received target torque Te*, and the received necessary advance amount ΔVT of the opening/closing timing of the intake valve 128. Initially, in order that the engine 22 can be operated efficiently at an operation point constituted by the target rotation number Ne* and the target torque Te*, a temporary opening/closing timing VTtmp of the intake valve 128 is set. Subsequently, an opening/closing timing on an advance side (earlier) relative to the temporary opening/closing timing VTtmp only by the necessary advance amount ΔVT is set to a target opening/closing timing VT*. The target opening/closing timing VT* thus set comes closer to the advance side as the target torque Te* (the fuel-efficiency torque Teef2) of the engine 22 becomes larger, and also comes closer to the advance side as the necessary increasing amount ΔTe (=Teef−Teef2) becomes larger. In order that the engine 22 can be operated efficiently at the operation point constituted by the target rotation number Ne* and the target torque Te*, a target throttle opening degree TH*, a target fuel injection amount Qf*, and a target ignition timing IT* are set by use of the target opening/closing timing VT*. The tendencies of the target throttle opening degree TH*, the target fuel injection amount Qf*, and the target ignition timing IT* are well known, so detailed descriptions thereof are omitted herein. Then, the intake-air amount control is performed by use of the target throttle opening degree TH*, the fuel injection control is performed by use of the target fuel injection amount Qf*, the ignition control is performed by use of the target ignition timing IT*, and the opening/closing timing control is performed by use of the target opening/closing timing VT*.

The opening/closing timing on the advance side relative to the temporary opening/closing timing VTtmp is set to the target opening/closing timing VT* so as to control the electric VVT 150. This allows the output torque Teest of the engine 22 to more quickly follow the target torque Te* when the target torque Te* (the fuel-efficiency torque Teef2) increases, in comparison with a case where the temporary opening/closing timing VTtmp is set to the target opening/closing timing VT* so as to control the electric VVT 150. That is, an output response of the engine 22 can be improved. Further, in the embodiment, the necessary advance amount ΔVT is set to have a tendency that the necessary advance amount ΔVT increase as the necessary increasing amount ΔTe increases, as described above. When the necessary increasing amount ΔTe is large, it is considered that the increase of the target torque Te* of the engine 22 continues to some extent after that. On this account, by making the necessary advance amount ΔVT large, the output torque Teest of the engine 22 is allowed to more appropriately follow the target torque Te*.

Figure 11:
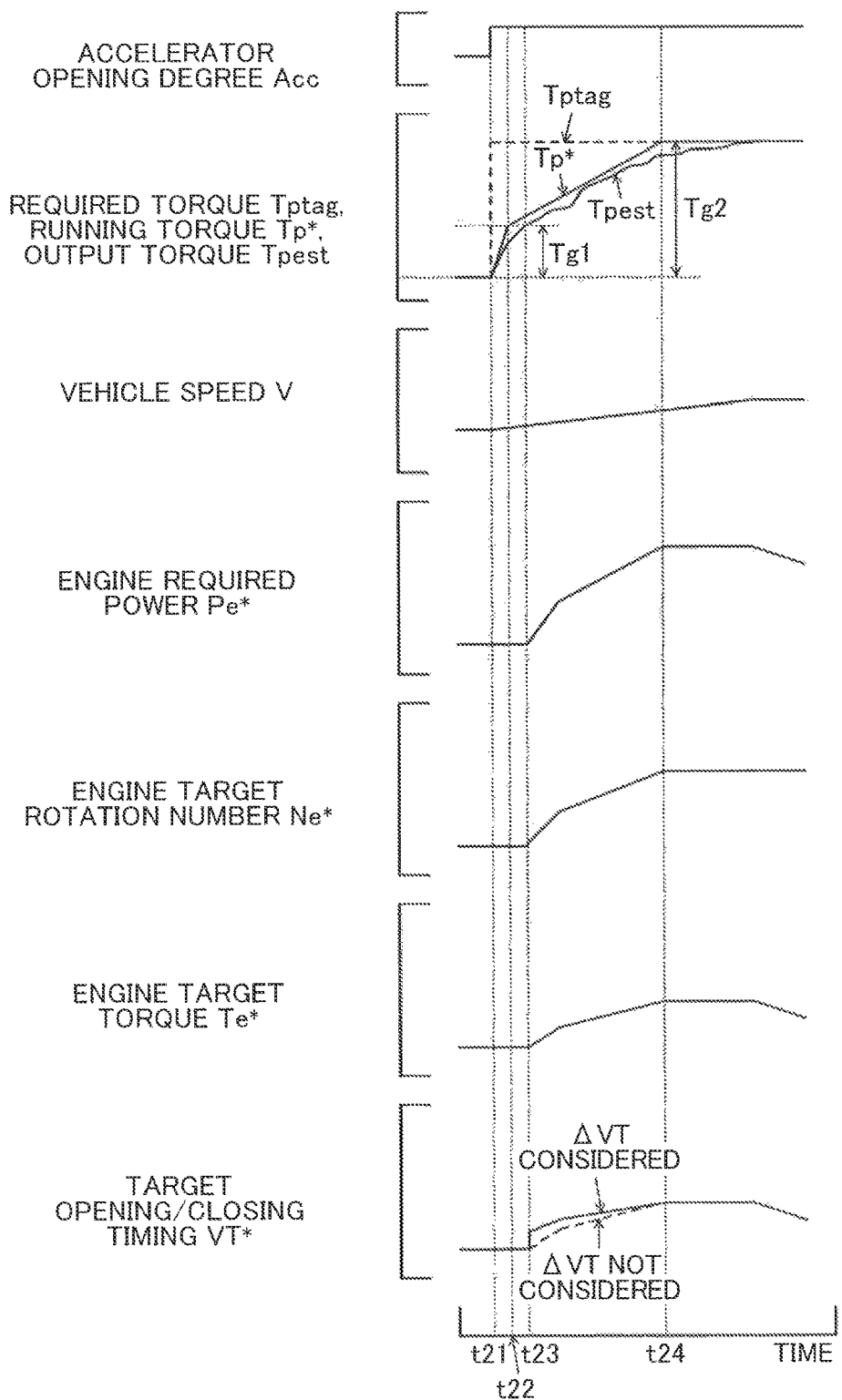
FIG. 11 is an explanatory view illustrating one example of a state where a driver requests a relatively large acceleration, according to the above embodiment.

FIG. 11 is an explanatory view illustrating one example of a state where the driver requests a relatively large acceleration. In FIG. 11, the accelerator opening degree Ace increases at a time t21, and in response to this, the required torque Tptag increases. As a result, the running torque Tp* of the drive shaft 36 increases by a relatively large first rate value J1 until the running torque Tp* reaches the torque (Tg0+Tg1) (from a time t21 to a time t22), and then, the running torque Tp* increases by a rate value J2, which is smaller than the first rate value J1, after the running torque Tp* has reached the torque (Tg0+Tg1) but before the running torque Tp* reaches the required torque Tptag (from a time t22 to a time t24). At this time, until the output torque Tpest of the drive shaft 36 reaches the torque (Tg0+Tg1) (from the time t21 to the time t23), increases of the target rotation number Ne* and the target torque Te* of the engine 22 are limited by limitation on the required power Pe*. Then, after the output torque Tpest of the drive shaft 36 reaches the torque (Tg0+Tg1) but before the running torque Tp* reaches the required torque Tptag (from the time t23 to the time t24), the target rotation number Ne* and the target torque Te* of the engine 22 increase along with the increase of the required power Pe*. In regard to the required power Pe*, the target rotation number Ne*, and the target torque Te*, the reason why an increase speed in the first half is larger than an increase speed in the second half within the times t23 to t24 is as follows. In the first half, due to the process of step S520, the maximum discharge required amount Pbmax gradually decreases toward the charging/discharging required power Pb*. Because of this, the required power Pe* easily increases as compared with the second half in which the maximum discharge required amount Pbmax reaches the charging/discharging required power Pb*. By such a series of controls, it is possible to restrain delay of the increase of the output torque Tpest of the drive shaft 36 with respect to the increase of the rotation number Ne of the engine 22. As a result, it is possible to give a good acceleration feeling to the driver. Further, when the output torque Tpest of the drive shaft 36 reaches the torque (Tg0+Tg1) (at the time t23), the target opening/closing timing VT* of the intake valve 128 comes closer to the advance side as the target torque Te* (the fuel-efficiency torque Teef2) of the engine 22 becomes larger, and also comes closer to the advance side as the necessary increasing amount ΔTe (Teef−Teef2) becomes larger. Hereby, the output torque Teest of the engine 22 is allowed to more appropriately follow the target torque Te*.

In the hybrid vehicle 20 of the embodiment described above, the running torque Tp* is set based on the required torque Tptag, and the engine 22 and the motors MG1, MG2 are controlled so that the running torque Tp* is output to the drive shaft 36. When the required torque Tptag of the drive shaft 36 becomes larger than the torque (Tg0+Tg1), the required power Pe* of the engine 22 is limited until the output torque Tpest of the drive shaft 36 reaches the torque (Tg0+Tg1), in comparison with the required power Pe* after the output torque Tpest of the drive shaft 36 has reached the torque (Tg0+Tg1). This makes it possible to restrain delay of the increase of the output torque Tpest of the drive shaft 36 with respect to the increase of the rotation number of the engine 22. As a result, it is possible to give a good acceleration feeling to the driver.

Further, in the hybrid vehicle 20 of the embodiment, in a case where the required torque Tptag of the drive shaft 36 becomes larger than the torque (Tg0+Tg1), after the output torque Tpest of the drive shaft 36 has reached the torque (Tg0+Tg1), the electric VVT 150 is controlled by setting the target opening/closing timing VT* of the intake valve 128 so as to come closer to the advance side as the target torque Te* (the fuel-efficiency torque Teef2) of the engine 22 becomes larger and also come closer to the advance side as the necessary increasing amount ΔTe (Teef−Teef2) becomes larger. Hereby, the output torque Teest of the engine 22 is allowed to more appropriately follow the target torque Te*. That is, an output response of the engine 22 can be improved.

In the hybrid vehicle 20 of the embodiment, in a case where the required torque Tptag becomes larger than the torque (Tg0+Tg1), the running torque Tp* is increased by use of the first rate value J until the running torque Tp* reaches the torque (Tg0+Tg1), and then, the running torque Tp* is increased by use of the second rate value J2 (<J1) after the running torque Tp* has reached the torque (Tg0+Tg1) but before the running torque Tp* reaches the required torque Tptag. However, regardless of whether the running torque Tp* reaches the torque (Tg0+Tg1) or not, the running torque Tp* may be increased to the required torque Tptag by use of a constant rate value.

In the hybrid vehicle 20 of the embodiment, when the required torque Tptag becomes larger than the cruising running torque Tg0, the running torque Tp* is increased to the required torque Tptag by a rate process using the first rate value J1 or the second rate value J2. However, the running torque Tp* may be increased to the required torque Tptag by performing a slow change process (e.g., an annealing process) except the rate process on the required torque Tptag. In a case where an annealing process is performed on the required torque Tptag so as to set the running torque Tp*, different time constants may be used before the running torque Tp* reaches the torque (Tg0+Tg1) and after the running torque Tp* has reached the torque (Tg0+Tg1), or the same time constant may be used.

In the hybrid vehicle 20 of the embodiment, when the required torque Tptag is larger than the torque (Tg0+Tg1), it is determined whether or not the driver requests a relatively large acceleration in step S420 of the second setting routine in FIG. 8A and FIG. 8B. However, instead of this, when the accelerator opening degree Ace is a threshold Aref or more, when a required acceleration αtag of the vehicle according to the accelerator opening degree Ace is a threshold αref or more, or when the running power Pdrv* is a threshold Pref or more, it may be determined that the driver requests a relatively large acceleration.

In the hybrid vehicle 20 of the embodiment, the torque (Tg0+Tg1) is used as a threshold to determine whether or not the driver requests a relatively large acceleration, and is also used as a threshold used to change the increase rate of the running torque Tp* from the first rate value J1 to the second rate value J2. However, the threshold to determine whether or not the driver requests a relatively large acceleration may be a value different from the torque (Tg0+Tg1). For example, a value slightly higher than the torque (Tg0+Tg1), a value slightly smaller than the torque (Tg0+Tg1), or the like may be used.

In the hybrid vehicle 20 of the embodiment, the upper limit power Pemax and the like of the engine 22 is changed according to whether the output torque Tpest of the drive shaft 36 is the torque (Tg0+Tg1) or less, or larger than the torque (Tg0+Tg1), in step S470 of the second setting routine in FIG. 8A and FIG. 8B. Alternatively, the upper limit power Pemax and the like of the engine 22 may be changed according to whether the running torque Tp* is the torque (Tg0+Tg1) or less, or larger than the torque (Tg0+Tg1).

In the hybrid vehicle 20 of the embodiment, the upper limit power Pemax of the engine 22 is set by performing lower limit guard by the power Pe0 on the value (Pdrv*−Pbmax) obtained by subtracting the maximum discharge required amount Pbmax of the battery 50 from the running power Pdrv*, in steps S480, S530 of the second setting routine in FIG. 8A and FIG. 8B. However, the upper limit power Pemax of the engine 22 may be set by performing lower limit guard by a value of 0 on the value (Pdrv*−Pbmax).

In the hybrid vehicle 20 of the embodiment, when the necessary advance amount ΔVT of the opening/closing timing of the intake valve 128 is set, the necessary advance amount ΔVT is set so as to have a tendency that the necessary advance amount ΔVT increases as the necessary increasing amount ΔTe(Teef−Teef2) increases. However, a constant positive value may be set to the necessary advance amount ΔVT. Even in this case, an output response of the engine 22 can be improved as compared with a case where the necessary advance amount ΔVT is not taken into consideration. Further, a value of 0 may be set to the necessary advance amount ΔVT, that is, the necessary advance amount ΔVT may not be taken into consideration.

In the hybrid vehicle 20 of the embodiment, the HVECU 70, the engine ECU 24, and the motor ECU 40 are configured as different electronic control units. However, they may be configured as a single electronic control unit.

Figure 12:
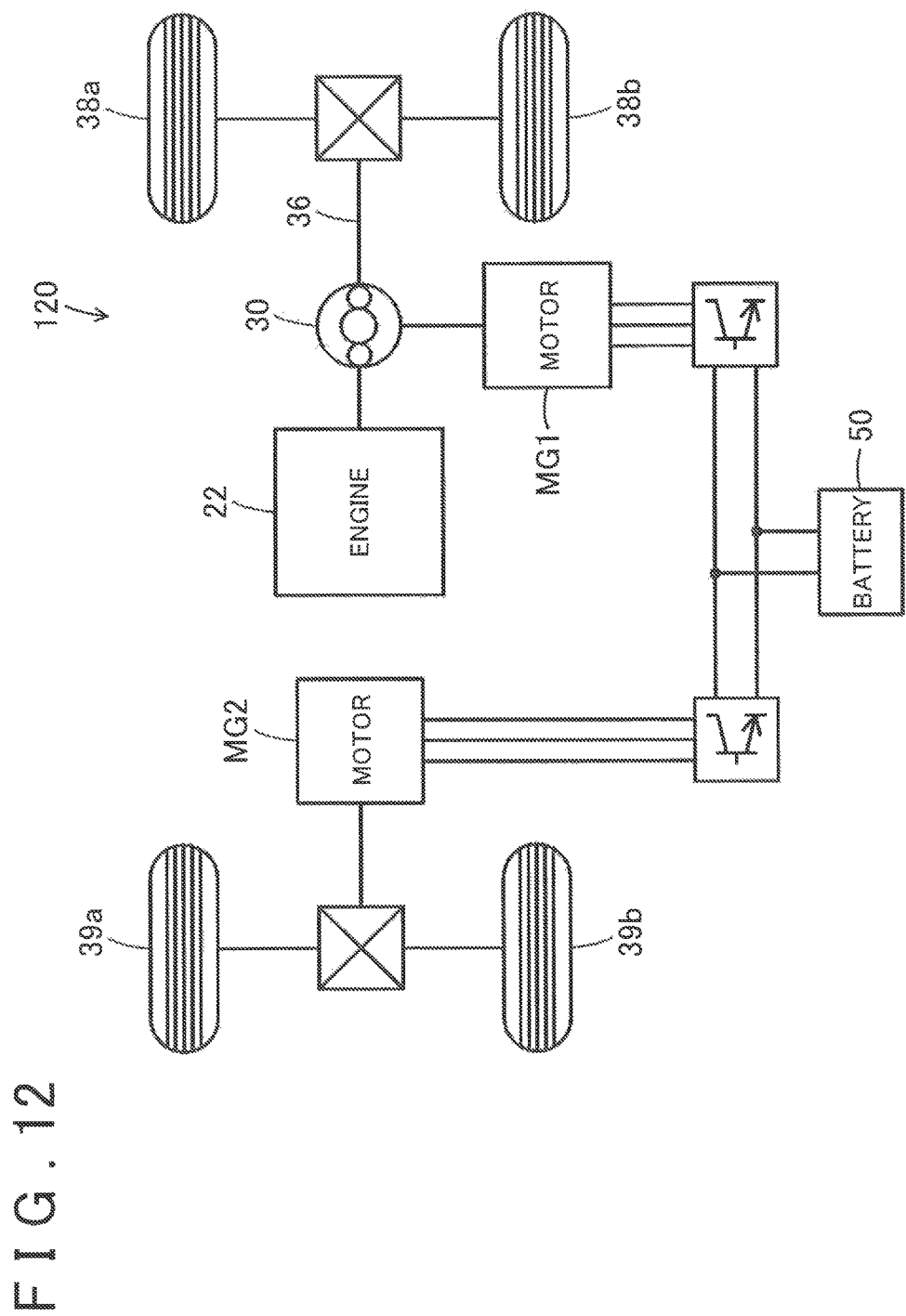
FIG. 12 is a configuration diagram illustrating an outline of a configuration of a hybrid vehicle 120 according to a modification.

In the hybrid vehicle 20 of the embodiment, a power from the motor MG2 is output to the drive shaft 36 connected to the driving wheels 38a, 38b. However, as illustrated in a hybrid vehicle 120 of a modification in FIG. 12, a power from a motor MG2 may be output to an axle (an axle connected to wheel assemblies 39a, 39b in FIG. 12) different from an axle (an axle connected to driving wheels 38a, 38b) to which a drive shaft 36 is connected.

Figure 13:
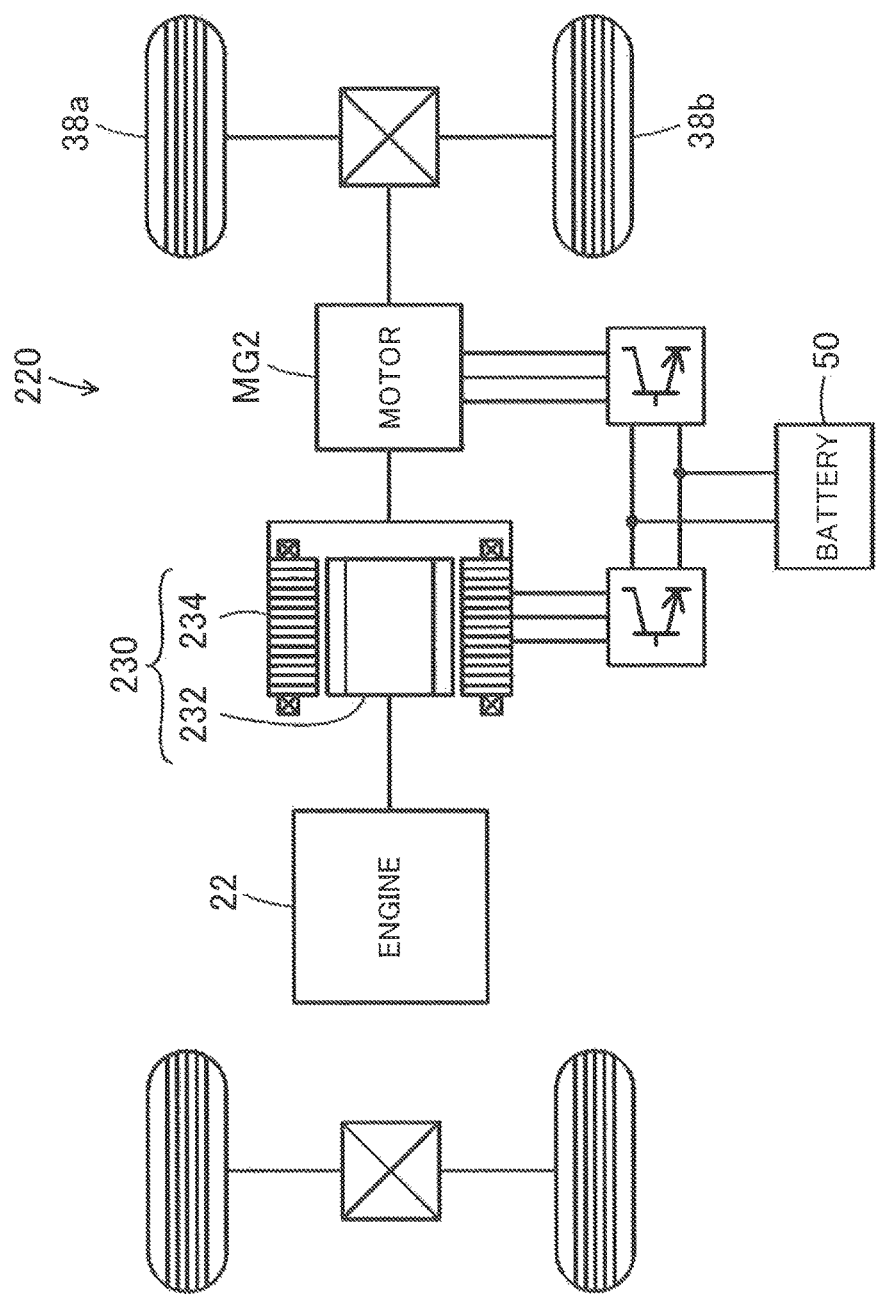
FIG. 13 is a configuration diagram illustrating an outline of a configuration of a hybrid vehicle 220 according to another modification.

In the hybrid vehicle 20 of the embodiment, a power from the engine 22 is output to the drive shaft 36 connected to the driving wheels 38a, 38b via the planetary gear 30. However, as illustrated in a hybrid vehicle 220 of a modification in FIG. 13, the hybrid vehicle 220 may include a paired-rotor electric motor 230 including an inner rotor 232 connected to a crankshaft of an engine 22, and an outer rotor 234 connected to a drive shaft 36 connected to driving wheels 38a, 38b. Here, the paired-rotor electric motor 230 transmits part of a power from the engine 22 to the drive shaft 36, and also converts a residual power into an electric power.

Figure 14:
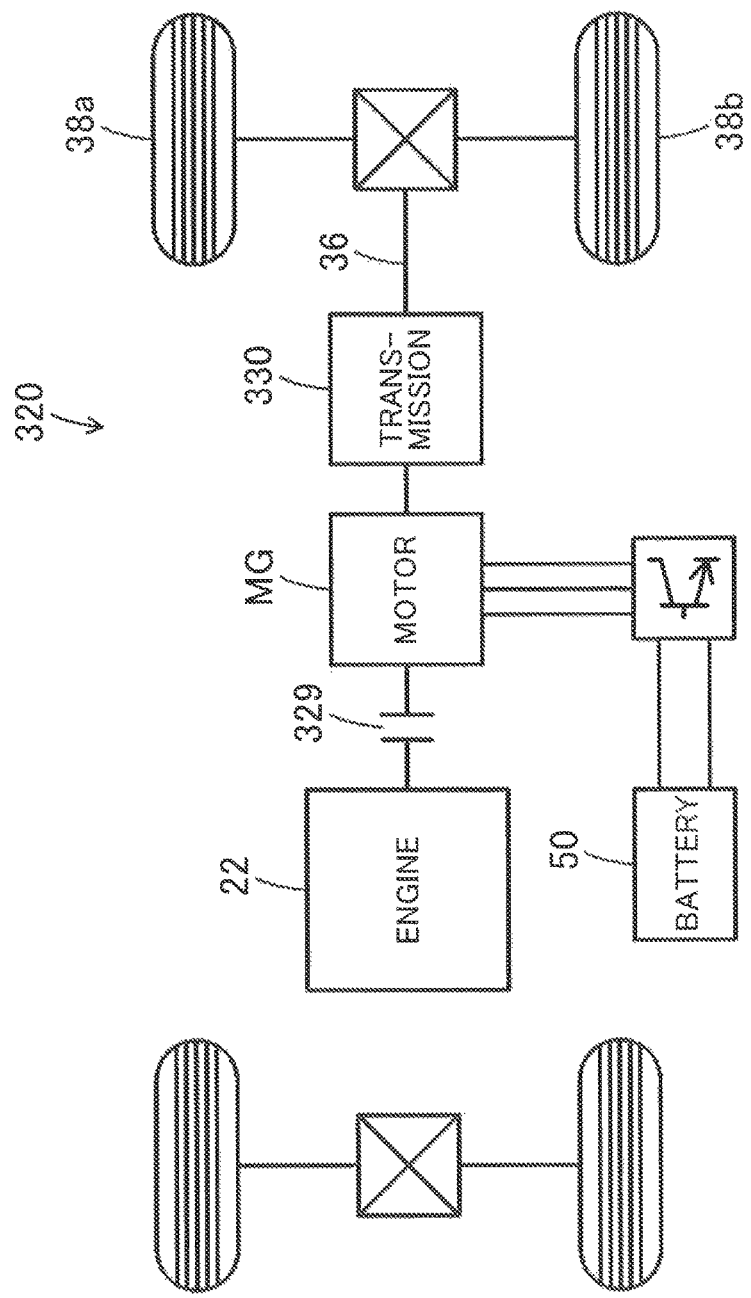
FIG. 14 is a configuration diagram illustrating an outline of a configuration of a hybrid vehicle 320 according to further another modification.

In the hybrid vehicle 20 of the embodiment, the power from the engine 22 is output to the drive shaft 36 connected to the driving wheels 38a, 38b via the planetary gear 30, and the power from the motor MG2 is output to the drive shaft 36. However, as illustrated in a hybrid vehicle 320 of a modification in FIG. 14, a motor MG may be connected, via a transmission 330, to a drive shaft 36 connected to driving wheels 38a, 38b, and an engine 22 may be connected to a rotating shaft of the motor MG. In this configuration, a power from the engine 22 is output to the drive shaft 36 via the rotating shaft of the motor MG and the transmission 330, and a power from the motor MG is output to the drive shaft 36 via the transmission 330.

In the embodiment, the motor MG2 is an example of a motor, and the HVECU 70, the engine ECU 24, and the motor ECU 40 are one example of an electronic control unit.

The present invention has been described above by use of the embodiment, but it is needless to say that the present invention is not limited to such an embodiment at all and may be performable in various embodiments as long as the various embodiments are not beyond the gist thereof.

What is claimed is:

1. A hybrid vehicle comprising:
an engine configured to output a power to a drive shaft, the drive shaft being connected to an axle of the hybrid vehicle;
a motor configured to output a power to the drive shaft;
a battery configured to exchange an electric power with the motor;
an electronic control unit configured to set a running torque based on a required torque of the drive shaft according to an accelerator opening degree, wherein:
the electronic control unit is configured to control the engine and the motor such that the running torque is output to the drive shaft,
the electronic control unit is configured to limit the power of the engine by use of the running torque or a drive-shaft torque output to the drive shaft as a torque for determination until the torque for determination reaches a torque threshold smaller than the required torque, as compared with the power of the engine after the torque for determination has reached the torque threshold, when a predetermined acceleration request is made by a user,
the electronic control unit is configured to limit the power of the engine by an upper limit power when the predetermined acceleration request is made,
the electronic control unit is configured to set the upper limit power based on a first power until the torque for determination reaches the torque threshold when the predetermined acceleration request is made, and the electronic control unit is configured to set the upper limit power based on a second power after the torque for determination has reached the torque threshold when the predetermined acceleration request is made,
the first power is larger one of a value of zero and a power corresponding to a difference between a running power corresponding to the running torque and an allowable output power of the battery, and
the second power is a power gradually approaching a third power according to the running power and a required power for charging and discharging the battery.

2. The hybrid vehicle according to claim 1, wherein
the electronic control unit is configured to perform lower limit guard on the first power or the second power by the running power before the predetermined acceleration request is made, so as to set the upper limit power, when the predetermined acceleration request is made.

3. The hybrid vehicle according claim 1, wherein
the engine includes a variable valve timing mechanism, the variable valve timing mechanism is configured to change an opening timing and a closing timing of an intake valve, and
the electronic control unit is configured to control the variable valve timing mechanism such that the opening timing and the closing timing comes closer to an advance side after the torque for determination has reached the torque threshold, as compared with the opening timing and the closing timing before the torque for determination reaches the torque threshold, when the predetermined acceleration request is made.

4. The hybrid vehicle according to claim 3, wherein
the electronic control unit is configured to set a first temporary torque of the engine by use of an operation line of the engine and a temporary required power according to a running power corresponding to the running torque and the required power for charging and discharging the battery, after the torque for determination has reached the torque threshold, when the predetermined acceleration request is made,
the electronic control unit is configured to set a second temporary torque of the engine by use of the operation line and an after-limitation required power obtained by limiting the temporary required power by the upper limit power of the engine, and
the electronic control unit is configured to control the engine so that the second temporary torque is output from the engine such that the opening timing and the closing timing approach the advance side as the second temporary torque becomes larger and also approach the advance side as a difference between the first temporary torque and the second temporary torque becomes larger.

5. The hybrid vehicle according to claim 1, wherein
when the predetermined acceleration request is made, the electronic control unit is configured to increase the running torque to the torque threshold by a first increase rate, and then increase the running torque to the required torque by a second increase rate, the second increase rate is smaller than the first increase rate.

6. The hybrid vehicle according to claim 1, wherein
the electronic control unit is configured to determine that the predetermined acceleration request is made when any of a plurality of conditions is established, the plurality of conditions includes:
a first condition that the required torque becomes larger than a second torque threshold;

a second condition that the accelerator opening degree becomes larger than an opening degree threshold;

a third condition that a required acceleration according to the accelerator opening degree becomes larger than an acceleration threshold; and a fourth condition that a power according to the required torque and a rotation number of the drive shaft becomes larger than a power threshold.

7. The hybrid vehicle according to claim 1, further comprising:

a generator configured to exchange an electric power with the battery; and a planetary gear including three rotating elements connected to the drive shaft, an output shaft of the engine, and a rotating shaft of the generator.

* * * * *